(12) United States Patent
Mo et al.

(10) Patent No.: US 7,386,027 B2
(45) Date of Patent: Jun. 10, 2008

(54) METHODS AND APPARATUS FOR GENERATING AND PROCESSING WIDEBAND SIGNALS HAVING REDUCED DISCRETE POWER SPECTRAL DENSITY COMPONENTS

(75) Inventors: Shaomin Samuel Mo, Monmouth Junction, NJ (US); Divaydeep Sikri, Harrison, NJ (US); Alexander D. Gelman, Smallwood, NY (US); Alexander M. Haimovich, North Brunswick, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 713 days.

(21) Appl. No.: 10/814,477

(22) Filed: Mar. 31, 2004

(65) Prior Publication Data

US 2005/0220172 A1 Oct. 6, 2005

(51) Int. Cl.
*H04B 1/00* (2006.01)
(52) U.S. Cl. .......................... 375/130; 375/260
(58) Field of Classification Search ................ 375/260, 375/130, 346, 295, 297, 146, 261; 370/281, 370/250–252
See application file for complete search history.

(56) References Cited

U.S. PATENT DOCUMENTS

| | | | |
|---|---|---|---|
| 6,015,088 A | 1/2000 | Parker et al. | |
| 6,019,286 A | 2/2000 | Li et al. | |
| 6,045,047 A | 4/2000 | Pidhirny et al. | |
| 6,060,722 A | 5/2000 | Havens et al. | |
| 6,062,475 A | 5/2000 | Feng | |
| 6,064,763 A | 5/2000 | Maltsev | |
| 6,095,422 A | 8/2000 | Ogami | |
| 6,097,839 A | 8/2000 | Liu | |
| 6,098,887 A | 8/2000 | Figarella et al. | |
| 6,109,528 A | 8/2000 | Kunert et al. | |
| 6,119,941 A | 9/2000 | Katsandres et al. | |
| 6,123,261 A | 9/2000 | Roustaei | |
| 6,123,263 A | 9/2000 | Feng | |
| 7,095,709 B2 * | 8/2006 | Walton et al. | 370/208 |
| 7,103,109 B2 | 9/2006 | Nakache et al. | |
| 7,184,713 B2 * | 2/2007 | Kadous et al. | 455/67.13 |
| 2001/0021182 A1 * | 9/2001 | Wakutsu | 370/344 |
| 2002/0003773 A1 * | 1/2002 | Okada et al. | 370/208 |
| 2002/0169585 A1 * | 11/2002 | Jones et al. | 702/189 |
| 2003/0138037 A1 * | 7/2003 | Kaku et al. | 375/229 |
| 2003/0147358 A1 * | 8/2003 | Hiramatsu et al. | 370/281 |
| 2005/0013240 A1 * | 1/2005 | Gerakoulis et al. | 370/208 |
| 2005/0185669 A1 * | 8/2005 | Welborn et al. | 370/465 |
| 2005/0190817 A1 * | 9/2005 | Batra et al. | 375/130 |
| 2006/0291578 A1 * | 12/2006 | Singh et al. | 375/260 |

* cited by examiner

*Primary Examiner*—Emmanuel Bayard
(74) *Attorney, Agent, or Firm*—RatnerPrestia

(57) ABSTRACT

Methods and apparatus for generating and processing wideband signals having reduced discrete power spectral density (PSD) components are disclosed. A wideband signal having reduced discrete PSD components is achieved by generating data symbols responsive to data for transmission, transforming one or more of the data symbols into a frame including one or more orthogonal frequency division multiplexing (OFDM) symbols, selectively inverting the frame responsive to a pseudo-random data sequence, and modulating wideband signal pulses of the wideband signal with the selectively inverted frame.

17 Claims, 25 Drawing Sheets

METHODS AND APPARATUS FOR GENERATING AND PROCESSING WIDEBAND SIGNALS HAVING REDUCED DISCRETE POWER SPECTRAL DENSITY COMPONENTS

FIELD OF THE INVENTION

The present invention relates to the field of communications and, more particularly, to methods and apparatus for generating and processing wideband signals having reduced discrete power spectral density components.

BACKGROUND OF THE INVENTION

Ultra wideband (UWB) technology uses base-band pulses of very short duration to spread the energy of transmitted signals very thinly from near zero to several GHz. When properly configured, UWB signals can coexist with other communication signals in the same spectrum with negligible mutual interference. The Federal Communications Commission (FCC) has specified UWB signal emission limits for UWB communication systems to prevent interference with other communication systems.

The emission profile of a UWB signal can be determined by examining its power spectral density (PSD). Characterization of the PSD of a "Time-Hopping Spread Spectrum" signaling scheme in the presence of random timing jitter using a stochastic approach is disclosed in an article by Moe et al. titled "On the Power Spectral Density of Digital Pulse Streams Generated by M-ary Cyclostationary Sequences in the Presence of Stationary Timing Jitter." See IEEE Tran. on Comm., Vol. 46, no. 9, pp. 1135-1145, September 1998. According to this article, the power spectra of UWB signals consists of a continuous component and discrete components. When total power is the same, the discrete components present higher PSD than the continuous component.

Presently, multi-band orthogonal frequency division multiplexing (OFDM) is being considered for use with UWB communication systems. In multi-band UWB communication systems using OFDM, the UWB frequency band is divided into sub-bands and OFDM modulation is applied to each sub-band.

There is an ever present desire to increase the communication distances of communication systems such as multi-band UWB communication systems using OFDM. One way to increase communication distance is to increase the power used for transmissions. To increase transmission power while still conforming to the FCC emission limits for UWB signals, it is desirable to reduce the discrete components so that overall power can be increased while still conforming to the FCC emission limits. In traditional communication systems, scramblers are commonly used for timing recovery and equalization. Therefore, these scramblers may not be efficient and/or effective in reducing discrete PSD components in sub-bands of multi-band UWB communication systems using OFDM, e.g., due to the high pulse repetition frequency (PRF), i.e., about 100 Mbps to 500 Mbps, and the time division multiple access (TDMA) frame structure of these systems. Accordingly, improved methods and apparatus for reducing discrete PSD components in sub-bands of multi-band UWB signals using OFDM are needed. The present invention fulfills this need among others.

SUMMARY OF THE INVENTION

The present invention is embodied in methods and apparatus for generating and processing wideband signals having reduced discrete power spectral density (PSD) components. A wideband signal having reduced discrete PSD components is achieved by generating data symbols responsive to data for transmission, transforming one or more of the data symbols into a frame including one or more orthogonal frequency division multiplexing (OFDM) symbols, selectively inverting the frame responsive to a random data sequence, and modulating wideband signal pulses of the wideband signal with the selectively inverted frame.

DETAILED DESCRIPTION OF THE INVENTION

Figure 1:
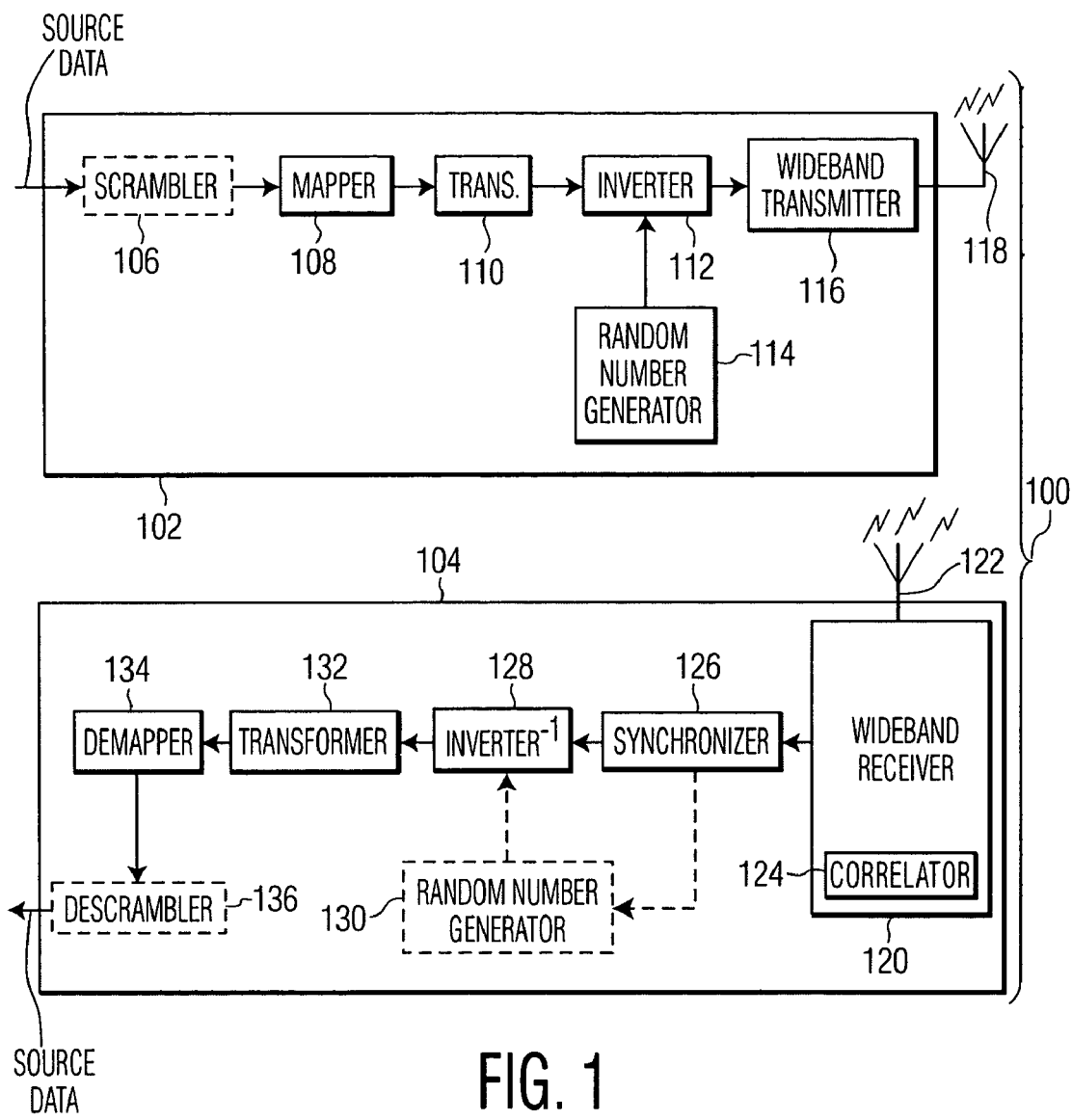
FIG. 1 is a block diagram of a OFDM wideband communication system in accordance with the present invention.

FIG. 1 is a conceptual representation of an exemplary orthogonal frequency division multiplexing (OFDM) wideband communication system 100 in accordance with the present invention. Functions of one or more blocks within the illustrated communication system 100 can be performed by the same piece of hardware or module of software. It should be understood that embodiments of the present invention may be implemented in hardware, software, or a combination thereof. In such embodiments, the various component and steps described below may be implemented in hardware and/or software.

In general overview, a transmitting apparatus 102 for transmitting source data selectively inverts and, optionally, scrambles the source data prior to transmission using an OFDM modulation scheme to reduce the discrete power spectral density (PSD) components of the transmitted data. A receiving apparatus 104 receives the transmitted data, demodulates the received data using an OFDM demodulation scheme, and reverses the inversion and optional scrambling to recover the original source data.

The components of the transmitting apparatus 102 and the receiving apparatus 104 are now described in detail. In an exemplary embodiment, the source data is applied to an optional scrambler 106 that is configured to scramble the source data. The scrambler 106 may scramble all of the source data except repetitive data, e.g., synchronization words. In an alternative exemplary embodiment, the source data is not scrambled and the optional scrambler 106 can be omitted.

In an exemplary embodiment, the scrambler 106 scrambles at least a portion of the source data using scrambling words. A table of eight exemplary scrambling words (numbered 0-7) are depicted in Table 1.

TABLE 1

| | |
|---|---|
| 0: | 0 0 0 0 |
| 1: | 0 0 0 1 |
| 2: | 0 0 1 0 |
| 3: | 0 0 1 1 |
| 4: | 0 1 0 0 |
| 5: | 0 1 0 1 |
| 6: | 0 1 1 0 |
| 7: | 0 1 1 1 |

The exemplary scrambling words may be logically combined with portions of the source data, e.g., using an XOR logic circuit (not shown), to scramble the source data.

In an alternative exemplary embodiment, a scrambler such as those described in proposals to the Institute of Electrical and Electronic Engineer's (IEEE) standard IEEE 802.15.3a is employed to scramble the source data. The proposed scramblers use a 15-bit linear feedback shift register (LFSR) to generate a pseudo-random binary sequence (PRBS) for the scrambler. At the beginning of each frame, the LFSR is loaded with predefined values (seeds), which are referred to herein as initial settings. Four seeds indexed with a two bit identifier ($b_1$, $b_0$) are defined for selection as the initial setting, which is illustrated in Table 2.

TABLE 2

| Seed identifier ($b_1$, $b_0$) | Seed value ($x_{14} \ldots x_0$) |
|---|---|
| 0, 0 | 0011 1111 1111 111 |
| 0, 1 | 0111 1111 1111 111 |
| 1, 0 | 1011 1111 1111 111 |
| 1, 1 | 1111 1111 1111 111 |

The seed values used for scrambling may be selected from the seed set using the two bit identifier. The selected seed is then logically combined with the source data, e.g., using an XOR logic circuit (not shown), to scramble the source data. The two bit identifier may be transmitted in a packet along with the source data for use in the receiver 104 to initialize a descrambler 134.

As depicted in Table 2, the seed values are highly correlated (i.e., only the first two bits of each seed value are unique) and, thus, the pseudo random sequences generated are highly correlated, resulting in line spectra (i.e., discrete PSD components) due to a lack of adequate randomness. The inventors have recognized that superior results in the suppression of discrete PSD components may be obtained through the use of uncorrelated seeds. Table 3 depicts an exemplary seed set for use with the scrambler 106.

TABLE 3

| Seed identifier ($b_1$, $b_0$) | Seed value ($x_{27} \ldots x_0$) |
|---|---|
| 0, 0 | 0100 1100 0000 0101 0001 0000 1110 |
| 0, 1 | 1011 1000 0101 1011 1001 1101 1010 |
| 1, 0 | 0101 1111 1101 0010 1000 0001 1001 |
| 1, 1 | 0000 1111 0010 1111 0011 0111 1111 |

In Table 3, there are four seed values and each seed value includes 28 bits. The seed values are substantially uncorrelated and, therefore, pseudo random sequences generated using these seed values are substantially uncorrelated. The seed set shown in Table 3 is for illustration only and seed sets with seeds having different seed values, more or less seeds, and more or less bits per seed may be employed. Those of skill in the art will understand how to generate suitable uncorrelated seed values for use in a seed set from the description herein.

A mapper 108 is coupled to the scrambler 106 to receive scrambled source data. The mapper 108 generates data symbols responsive to the source data. In an exemplary embodiment, the mapper 108 maps source data bits to data symbols in a frequency domain. The mapper 108 may use a constellation mapping scheme such as, by was of non-limiting example, binary phase shift keying (BPSK), quadrature phase shift keying (QPSK), or quadrature amplitude modulation (QAM). The mapper 108 may perform additional known functions such as convolutional encoding, puncturing, and bit interleaving.

A transformer 110 is coupled to the mapper 108 to receive the data symbols. The transformer 110 transforms the data symbols from the frequency domain to a frame including one or more OFDM symbols in a time domain. In an exemplary embodiment the transformer 110 employs an inverse Fourier transform such as an inverse discrete Fourier transform (IDFT) or an inverse fast Fourier transform (IFFT). The transformer 110 maps the frame of data symbols onto a set of orthogonal frequency sub-carriers where each symbol is mapped to a different sub-carrier. In an exemplary embodiment, the transformer 110 takes in N data symbols at a time where N is the number of available frequency sub-carriers to form a frame (e.g., a TDMA frame) of OFDM symbols comprised of pulses that represent a summation of sinusoidal values for all N data symbols (i.e., N carriers).

An inverter 112 is coupled to the transformer 110 to receive the frame of OFDM symbols. The inverter 112 selectively inverts the frame of OFDM symbols according to a predetermined inverting function. In an exemplary embodiment, the inverter 112 selectively inverts the frame by selectively inverting entire frames of OFDM symbols responsive to bits of a random or pseudo-random number sequence. In an alternative exemplary embodiment, the inverter 112 selectively inverts the frame by selectively inverting one or more individual OFDM symbols within the frame responsive to bits of a pseudo-random number sequence. The inverter 112 may be a multiplexer (not shown) that passes either an OFDM symbol or the inverse of the OFDM symbol, e.g., as inverted by an inverter circuit (not shown), responsive to bits of the random or pseudo-random number sequence. The inverter 112 may invert pulses of OFDM symbols out of the transformer 110 or may invert waveforms generated from the pulses. As used herein, random number generator, random number sequence, and random number may be used to refer to both random and pseudo-random generators, sequences, and numbers.

In an exemplary embodiment, the inverter 112 is coupled to a random number generator 114. The random number generator 114 generates random numbers or pseudo-random numbers that are at least substantially evenly distributed to produce the random or pseudo-random number sequence used by the inverter 112 to selectively invert the frame of OFDM symbols. A suitable random number generator will be understood by those of skill in the art from the description herein.

A wideband transmitter 116 is coupled to the inverter 112. The wideband transmitter 116 transmits the selectively inverted frame of OFDM symbols via an antenna 118. In an exemplary embodiment, OFDM symbol pulses generated by the transformer 110 are smoothed using an interpolation function and then up-converted to match the number of frequency carriers in at least a portion of the wideband signal. The wideband transmitter 116 then modulates the up-converted frame of OFDM symbol pulses onto wideband pulses of the wideband signal such as UWB pulses of a UWB signal. The up-converted OFDM symbol pulses of the frame may be modulated onto wideband pulses over the entire wideband signal or onto wideband pulses within a portion of the wideband signal such as a sub-band of a multi-band wideband signal. The wideband transmitter 116 may be a UWB transmitter or a multi-band UWB transmitter.

A wideband receiver 120 within the receiving apparatus 104 receives the transmitted wideband signal through another antenna 122 and processes the wideband signal to recover the selectively inverted frame of OFDM symbol pulses. A correlator 124 within the wideband receiver 120 correlates the received data to the pulse shape used by the transmitting apparatus 102 to identify wideband signal pulses and convert them to digital pulses. In an exemplary embodiment, the correlator 124 is a matched filter correlator configured to identify and correlate incoming frames of OFDM wideband signal pulses such as OFDM UWB pulses. The wideband receiver 120 processes the correlated OFDM pulses to recover the selectively inverted frame of OFDM symbols. The wideband receiver 120 may be an UWB receiver or a multi-band UWB receiver.

A synchronizer 126 is coupled to the wideband receiver 120. The synchronizer 126 synchronizes the frames of the OFDM symbol pulses for processing to recover the original source data. In an exemplary embodiment, the synchronizer 126 identifies a beginning of a frame by correlating predefined preambles with the received OFDM signal pulses. Where entire frames of OFDM symbols are selectively inverted, the synchronizer 126 may additionally determine if the correlating function for a frame produces a maximum positive value (indicating that the frame has not been inverted) or a maximum negative value (indicating that the frame has been inverted). The synchronizer may then generate a positive value signal if a maximum positive value is determined and a negative value signal if a maximum negative value is determined.

An inverter$^{-1}$ 128 is coupled to the synchronizer 126 to receive the selectively inverted frame of OFDM symbols. The inverter$^{-1}$ 128 is configured to selectively invert the selectively inverted frame of OFDM symbols to reverse the selective inversion introduced in the transmitter 102 by the inverter 112 and, thus, recover the original frame of OFDM symbol in the time domain. The inverter$^{-1}$ 128 reverses the inversion according to a predefined inverting function that is based on the inverting function of the inverter 112. In an exemplary embodiment, the inverter$^{-1}$ 128 is coupled to a random number generator 130 that is substantially identical to the random number generator 114 described in detail above (and, thus, is not described in further detail here). The inverter$^{-1}$ 128 may be a multiplexer (not shown) that selectively passes the selectively inverted frame (or OFDM symbols within the frame) or the inverse of the selectively inverted frame (or individual OFDM symbols within the frame), e.g., as inverted by an inverter logic circuit (not shown), responsive to individual bits within a pseudo random number sequence generated by the random number generator 130.

The two random number generators 110 and 130 generate identical pseudo random number sequences. For synchronization, the generators 110 and 130 may be configured to start at a common point when the first bit of a sequence is transmitted or received, e.g., as identified by the synchronizer 126. Instead of generating pseudo random numbers when data is ready for transmission (e.g., "on the fly"), a set of random numbers can be generated in advance and stored in an array. The same array is kept in the random number generators 110, 130 in both the transmitting apparatus 102 and the receiving apparatus 104. In an exemplary embodiment, a random number is generated as an index to the stored array and is transmitted for use in establishing synchronization between the transmitting apparatus 102 and the receiving apparatus 104.

In embodiments where entire frames are selectively inverted, the inverter$^{-1}$ 128 may selectively invert the frame of OFDM symbols responsive to positive and negative maximum values identified by the synchronizer 126. In an exemplary embodiment, the inverter$^{-1}$ 128 inverts the frame when a negative value signal is received from the synchronizer 126 and does not invert the frame when a positive value signal is received from the synchronizer 126. Thus, when entire frames are selectively inverted, the random number generator 130 can be omitted. This enables the random number generator 114 in the transmitter 102 to be either a random number generator or a pseudo-random number generator.

A transformer 132 is coupled to the inverter$^{-1}$ 128 to receive the original frame of OFDM symbols. The transformer 132 transforms the original frame of OFDM symbols from the time domain to data symbols in the frequency domain that were sent to the transformer 110 in the transmitter 102.

A demapper 134 is coupled to the transformer 132 to receive the data symbols. The demapper 134 is configured to generate the original source data responsive to the data symbols. The demapper 134 may use a constellation demapping scheme such as, by was of non-limiting example, binary phase shift keying (BPSK), quadrature phase shift keying (QPSK), and quadrature amplitude modulation (QAM). The demapper 134 may perform additional known functions such as frequency domain equalization (FEQ), de-interleaving, and Viterbi decoding.

An optional descrambler 136 is coupled to the demapper 134 to receive the source data. In an exemplary embodiment, the descrambler 136, after synchronization, reverses the scrambling introduced to the source data by the scrambler 106 to yield the original source data. The descrambler 136 reverses the scrambling according to a predefined descrambling function that is based on the scrambling function used by the scrambler 106. Where the scrambler 106 is omitted, the descrambler 136 may be omitted.

Figure 2:
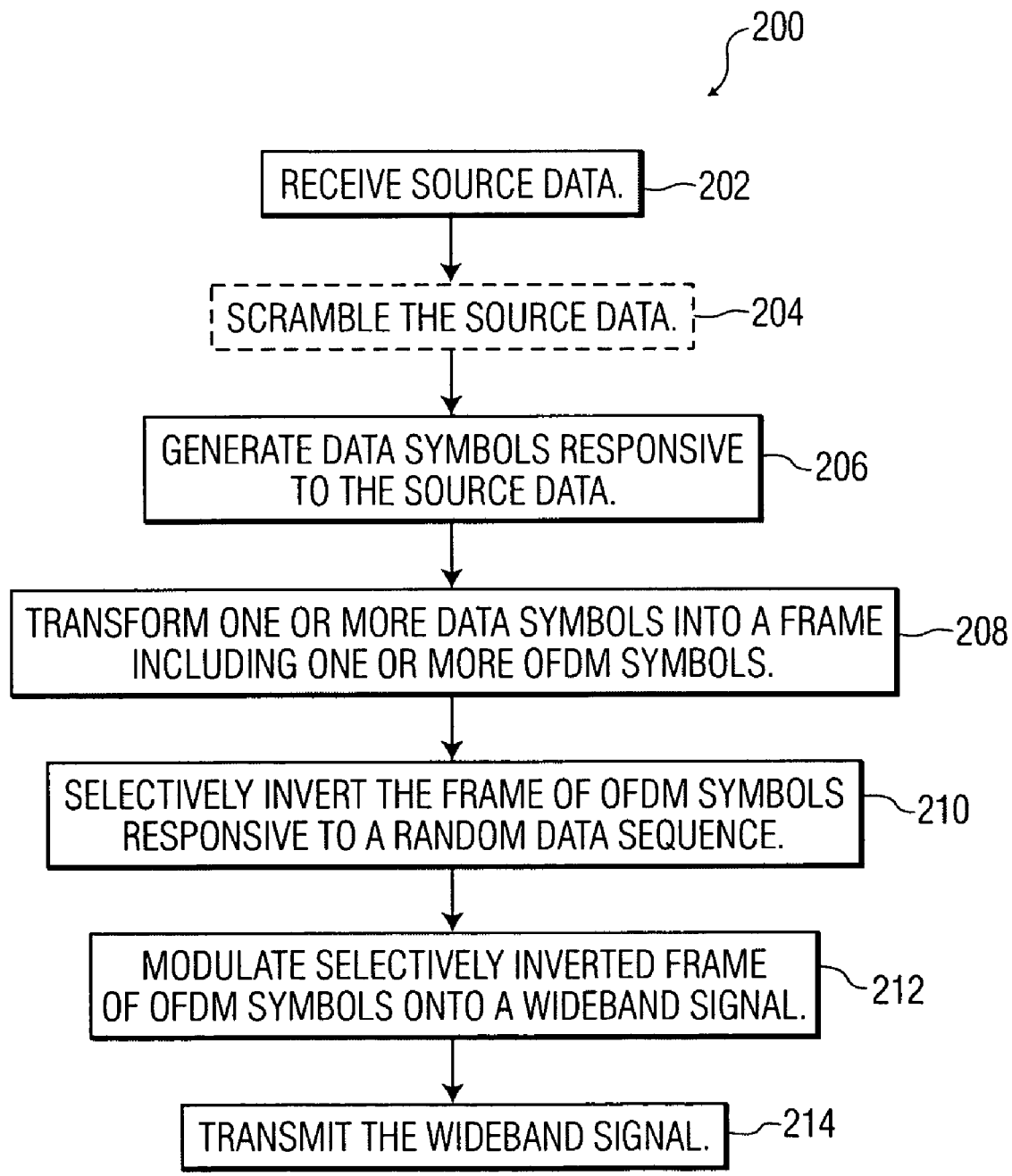
FIG. 2 is a flow chart of exemplary processing steps for transmitting OFDM wideband signals in accordance with the present invention.

FIG. 2 depicts a flow chart 200 of exemplary processing steps for transmitting a wideband signal such as a UWB wideband signal with reduced discrete PSD components. The steps of flow chart 200 are described with reference to the components of FIG. 1. At block 202, the transmitter 102 receives the source data for transmission.

At block 204, the optional scrambler 106 scrambles the source data. The source data may include frames of data including payload data and non-payload data, e.g., synchronization data. In an exemplary embodiment, the source data is scrambled according to a predetermined scrambling function, e.g., using scrambling words. The synchronization data may be all one symbol such as all positive (+) 1's. In an alternative exemplary embodiment, the source data is not scrambled and the optional scrambler 106 and block 204 can be omitted.

At block 206, the mapper 108 generates data symbols responsive to the source data. In an exemplary embodiment, the data symbols are in a frequency domain and are generated from the source data using a BPSK, QPSK, QAM, or other such modulation scheme.

At block 208, the transformer 110 transforms one or more data symbols into a frame including one or more OFDM symbols. The transformer 110 is an inverse Fourier transformer such as an IDFT or an IFFT that transforms the data symbols, which are in the frequency domain, into a frame of OFDM symbols in the time domain. In an exemplary embodiment, the transformer 110 transforms N data symbols at a time into the frame of OFDM symbols where N is the number of sub-carriers in the system.

At block 210, the inverter 112 selectively inverts the frame including one or more OFDM symbols responsive to a random or pseudo-random number sequence generated by the random number generator 114. In an exemplary embodiment, the inverter 112 selectively inverts the entire frame of OFDM symbols responsive to a single bit of the random or pseudo-random number sequence. In an alternative exemplary embodiment, the inverter 112 selectively inverts one or more OFDM symbols within a frame responsive to a signal bit of a pseudo-random number sequence.

At block 212, the wideband transmitter 116 modulates selectively inverted frames of OFDM symbols onto wideband pulses of a wideband signal such as UWB pulses of a UWB signal. In an exemplary embodiment, the frame of OFDM symbols is modulated onto wideband pulses within at least a portion of the wideband signal. For example, the data symbol may be modulated onto wideband pulses of the entire wideband signal or of a sub-band of a multi-band wideband signal.

At block 214, the transmitter 102 transmits the wideband signal modulated with the selectively inverted frame of OFDM symbols from the antenna 118.

Figure 3:
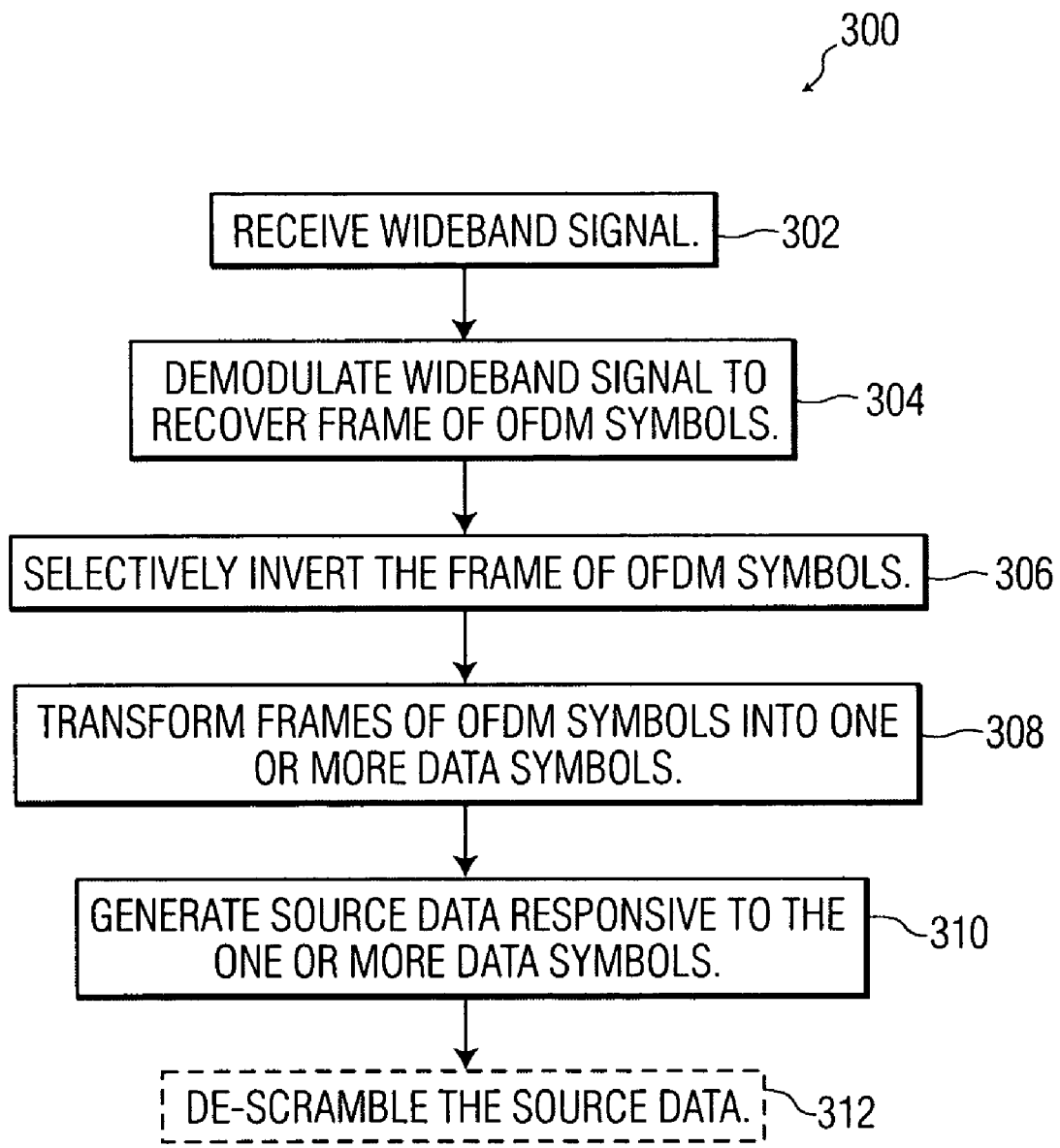
FIG. 3 is a flow chart of exemplary processing steps for receiving OFDM wideband signals in accordance with the present invention.

FIG. 3 depicts a flow chart 300 of exemplary steps for processing a received wideband signal in accordance with the present invention. The steps of flow chart 300 are described with reference to the components of FIG. 1. At block 302, the wideband receiver 120 within the receiving apparatus 104 receives the transmitted wideband signal carrying the selectively inverted frame of OFDM symbols through the antenna 122 and, at block 304, the wideband receiver 120 demodulates the wideband signal to recover the selectively inverted frame of OFDM symbol in the time domain.

At block 306, the inverter$^{-1}$ 128 reverses the inversion introduced by the inverter 108 by selectively inverting the frame of OFDM symbols. In an exemplary embodiment, the frame is selectively inverted responsive to a pseudo-random number sequence generated by the random number generator 130 to recover the original frame of OFDM symbols. The random number generator 130 may be synchronized by the synchronizer 126. In an alternative exemplary embodiment, where entire frames of OFDM symbols are selectively inverted, the frame may be selectively inverted responsive to minimum and maximum values identified by the synchronizer 126 during a correlation function and, thus, the random number generator 130 may be omitted.

At block 308, the transformer 132 transforms the frame of OFDM symbol in the time domain into one or more data symbols in the frequency domain. At block 310, the demapper 134 generates source data responsive to the one or more data symbols. In an exemplary embodiment, the source data is generated from the data symbols by reversing the BPSK, QPSK, QAM, or other such modulation scheme used by the mapper 108. At block 312, the optional descrambler 136 reverses the scramble introduced by the optional scrambler 106 to derive the original source data. In embodiments where the source data is not scrambled, the descrambler 136 and the step in block 312 are omitted.

Additional implementation details are now provided for the exemplary communication system 100 described above with reference to FIGS. 1, 2, and 3. The analysis and simulation details below show that line spectra (i.e., discrete PSD components) is an issue for multi-band OFDM UWB systems. In addition, the analysis and simulation details below show the improvements in line spectra achievable using the present invention.

An analysis is now provided of the PSD of a current multi-band OFDM UWB sequence for use in wireless systems such as proposed for IEEE standard 802.15.3a set forth by the Institute of Electrical and Electronic Engineers (IEEE).

In a multi-band OFDM UWB communication systems, a digitally controlled signal is used that produces random transmissions at multiples of the clock period. This signaling technique can be modeled as shown in equation 1:

$$s(t) = \sum_{n=-\infty}^{\infty} Re\left\{ \sum_{k=-\frac{N_s}{2}}^{\frac{N_s}{2}-1} d_{n,k+\frac{N_s}{2}} \exp\left(j2\pi\left(f_n - \frac{k+0.5}{T}\right)(t-nT_s)\right) \right\} f_n \in \quad (1)$$

$$\{f_m: m = 1, \ldots, M\}, nT_s \le t \le nT_s + T$$

where Ts equals the symbol clock period or pulse rate, n is the symbol index, Ns equals the number of tones or sub-carriers in the symbols, t is the timing, $\{d^{n,k+N/2}\}$ is an unbalanced binary independent identically distributed (i.i.d.) random sequence, and $\{f_m\}$ is the center frequency of each sub-band.

If M bands are used and OFDM symbols are transmitted on sub-bands in turns, the waveform of carrier k in band m can be expressed as shown in equation (2).

$$s_{m,k}(t) = \sum_{n=-\infty}^{\infty} Re\left\{ d_{n,k+\frac{N_s}{2}} \exp\left(j2\pi\left(f_m - \frac{k+0.5}{T}\right)(t-(nM+m)T_s)\right) \right\} 1 \le \quad (2)$$

$$m \le M, (nM+m)T_s \le t \le (nM+m)T_s + T$$

If BPSK modulation is used on each carrier, the waveform of carrier k on sub-band m can be expressed as shown in equation 3.

$$s_{m,k}(t) = A_1 \sum_{n=-\infty}^{\infty} a_{n,m,k} w_{m,k}(t-(nM+m)T_s) \quad (3)$$

where $A_1$ is the scale coefficient, $$w_{m,k}(t) = \cos\left(2\pi\left(f_m - \frac{k+0.5}{T}\right)t\right), \text{ and}$$

$$Pr\{a_{n,m,k}\} = \begin{cases} p, & a_{n,m,k} = 1 \\ 1-p, & a_{n,m,k} = -1 \end{cases}.$$

For QPSK modulations, the waveform of carrier k on band m can be expressed as shown in equation 4.

$$s_{m,k}(t) = A_2 \sum_{n=-\infty}^{\infty} a_{n,m,k} w_{m,k}(t-(nM+m)T_s) \quad (4)$$

where $A_2$ is the scale coefficient and $$w_{m,k}(t) \in \left\{ \cos\left(2\pi\left(f_m - \frac{k+0.5}{T}\right)t\right) + \Phi_l: l=1,2, |\Phi_1 - \Phi_2| = \pi/4 \right\}, \text{ and}$$

$$Pr\{a_{n,m,k}\} = \begin{cases} p, & a_{n,m,k} = 1 \\ 1-p, & a_{n,m,k} = -1 \end{cases}.$$

The PSD of the signals in equations 3 and 4 each consist of continuous component and discrete component, which are expressed, respectively, in equations 5.

$$S^c_{m,k}(f) = \frac{1-(2p-1)^2}{MTs}|W_{m,k}(f)|^2 \quad (5)$$

$$S^d_{m,k}(f) = \frac{(2p-1)^2}{(MTs)^2} \sum_{l=-\infty}^{\infty} \left|W_{m,k}\left(\frac{l}{MTs}\right)\right|^2 \delta_D\left(f - \frac{l}{MTs}\right)$$

The total PSD is the superposition of the two spectra of the waveforms expressed by equations 5.

From equations 5, it can be seen that the PSD is determined according to four factors, i.e., $W_{m,k}(f)$—pulse shape and transmission power of carrier k in sub-band m;

Ts—clock period or pulse rate;

p—distribution of $a_n$; and

M—total number of sub-bands.

When p=0.5, lines in each sub-band due to the discrete components are minimized or removed, thereby minimizing the PSD of each sub-band. The new PSD can be expressed as shown in equations 6.

$$S^c_{m,k}(f) = \frac{1}{MTs}|W_{m,k}(f)|^2 \quad (6)$$

$$S^d_{m,k}(f) = 0, -\frac{N_s}{2} \le k \le \frac{N_s}{2} - 1 \text{ and } 1 \le m \le M$$

Details regarding aspects of the present invention to reduce the discrete PSD component of multi-band UWB signals is now provided. Based on the preceding analysis of the PSD of multi-band UWB signals, selective phase reversion (inversion) is proposed to reduce/eliminate line frequencies due to discrete PSD components.

First, a random sequence $\{b_{n,m,k}\}$ is generated. The random sequence includes an evenly distributed function represented by equation 7.

$$Pr\{b_{n,m,k}\} = \begin{cases} 0.5, & b_{n,m,k} = 1 \\ 0.5, & b_{n,m,k} = -1 \end{cases} \quad (7)$$

Second, the data sequence and the random sequence are combined, e.g., using an exclusive OR (XOR) operation on sequences $\{a_{n,m,k}\}$ and $\{b_{n,m,k}\}$ as shown in equation 8 to produce a new sequence $\{c_{n,m,k}\}$. The new sequence $\{c_{n,m,k}\}$ is then used for transmission.

$$c_{n,m,k} = a_{n,m,k} \hat{b}_{n,m,k} \quad (8)$$

This process reduces/removes lines (i.e., discrete components) in the PSD of UWB signals in each sub-band, which is equivalent to minimizing the PSD in each sub-band.

Simulations are now provided to show that the line spectra is still an issue for multi-band OFDM systems without selective inversion. The simulation also show that applying selective inversion suppresses line spectra and reduce the PSD of multi-band OFDM UWB signals.

Figure 4:
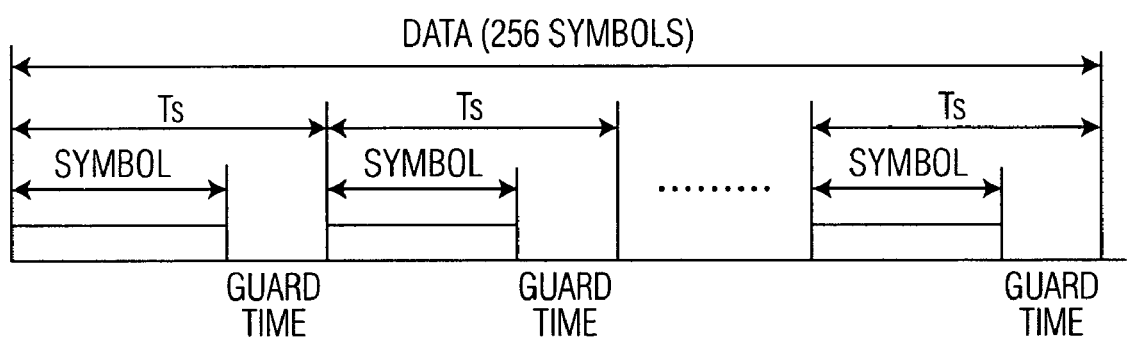
FIG. 4 is a timeline depicting configurations for use in simulations in accordance with the present invention.
Figure 5A:
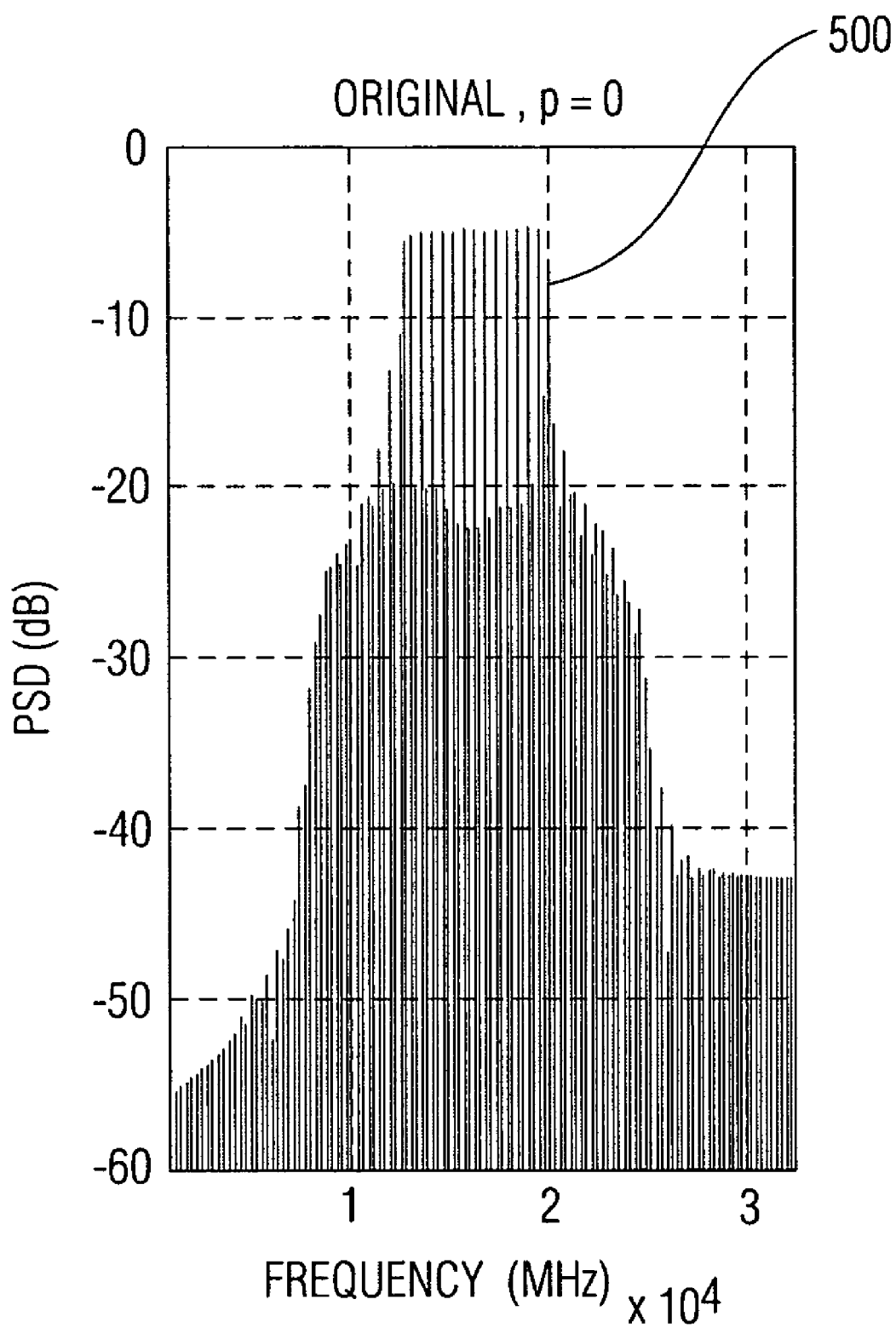
FIGS. 5A, 6A, and 7A are graphs depicting PSD versus frequency for source data having 0%, 25%, and 40% of a particular data value (e.g., a value of one (1)), respectively, processed using multi-band OFDM with BPSK modulation in accordance with the prior art.
Figure 5B:
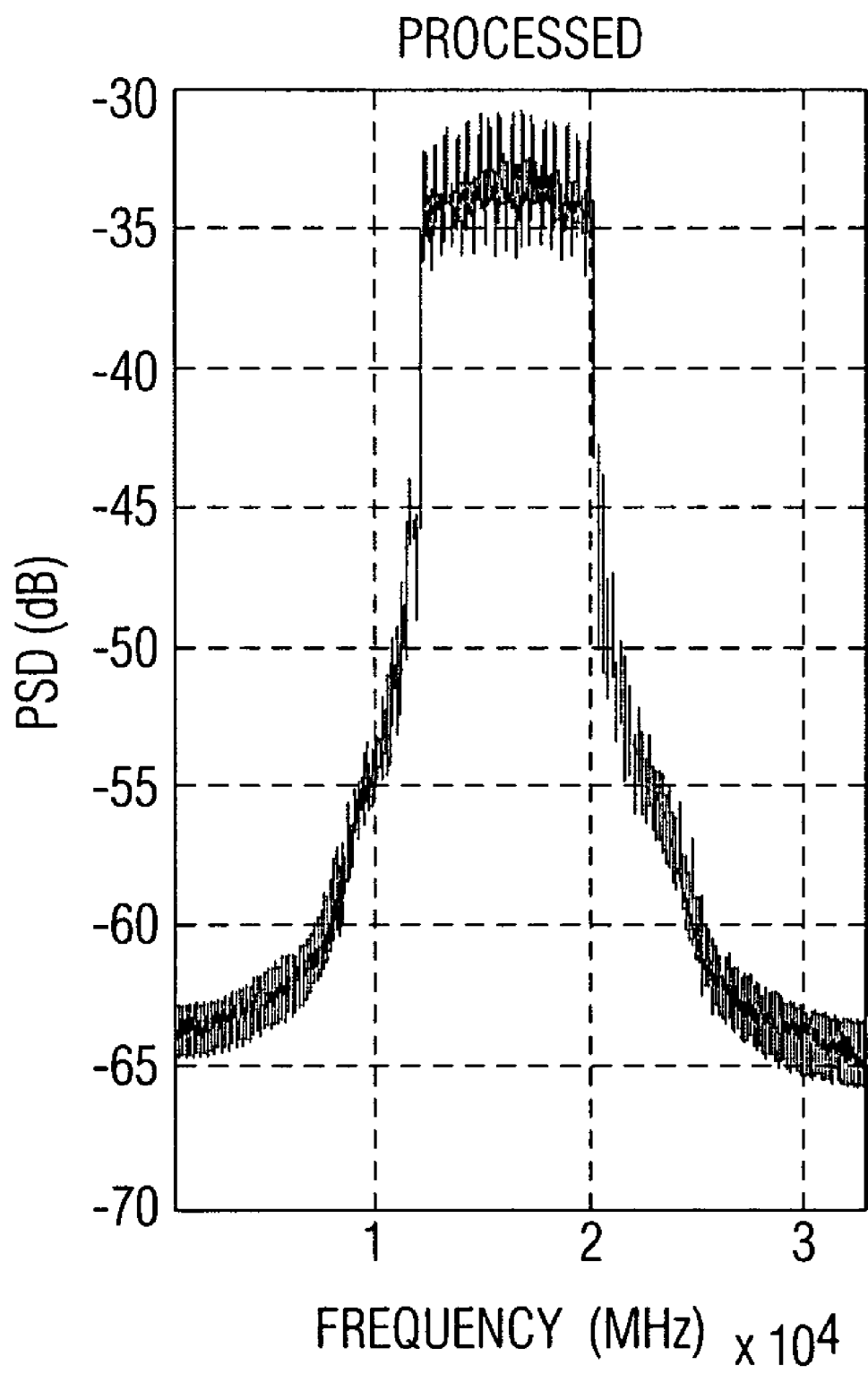
FIGS. 5B, 6B, and 7B are graphs depicting PSD versus frequency for source data with 0%, 25%, and 40% of a particular data value, respectively, processed using multi-band OFDM with BPSK modulation and selective inversion in accordance with the present invention.
Figure 6A:
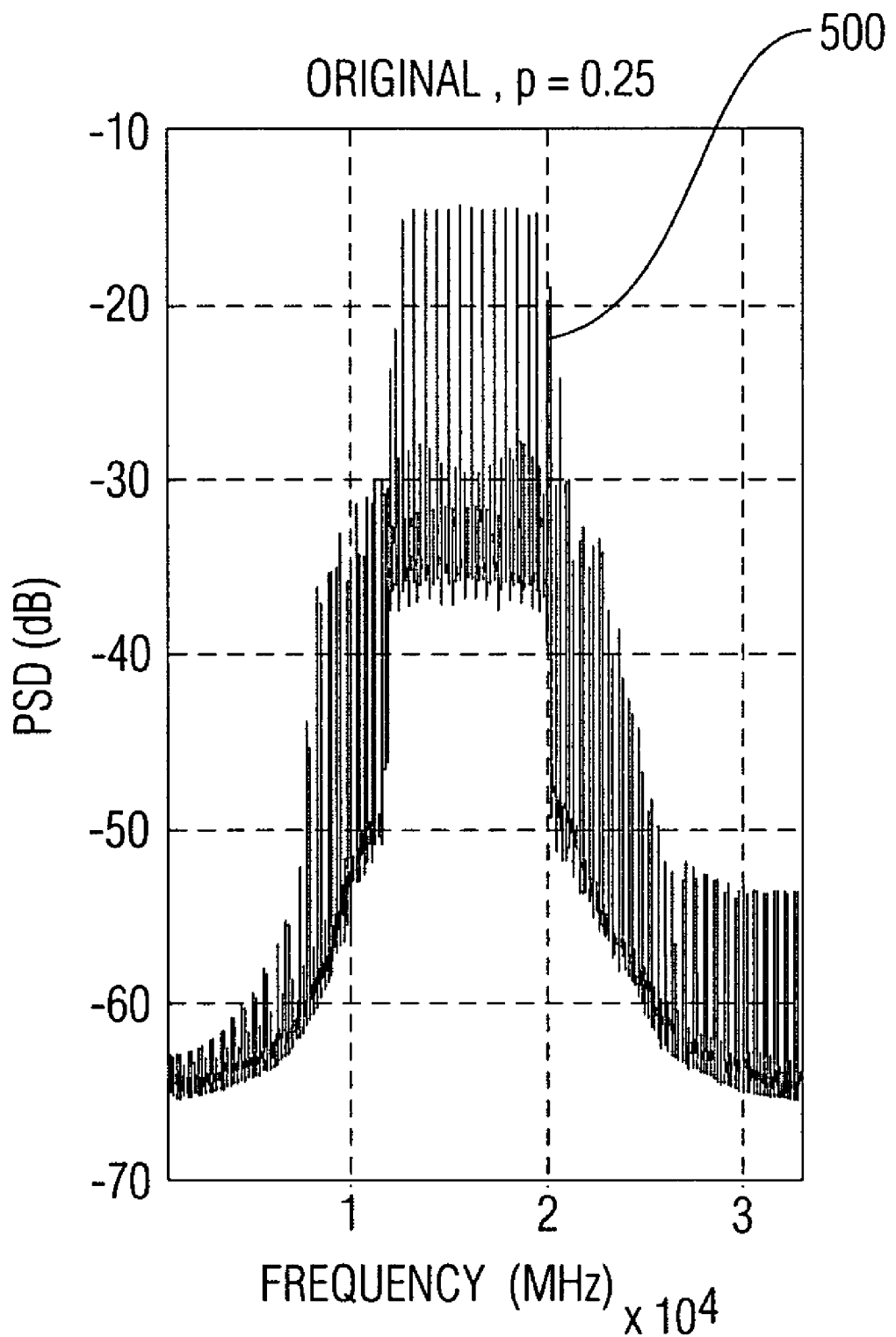
Figure 6B:
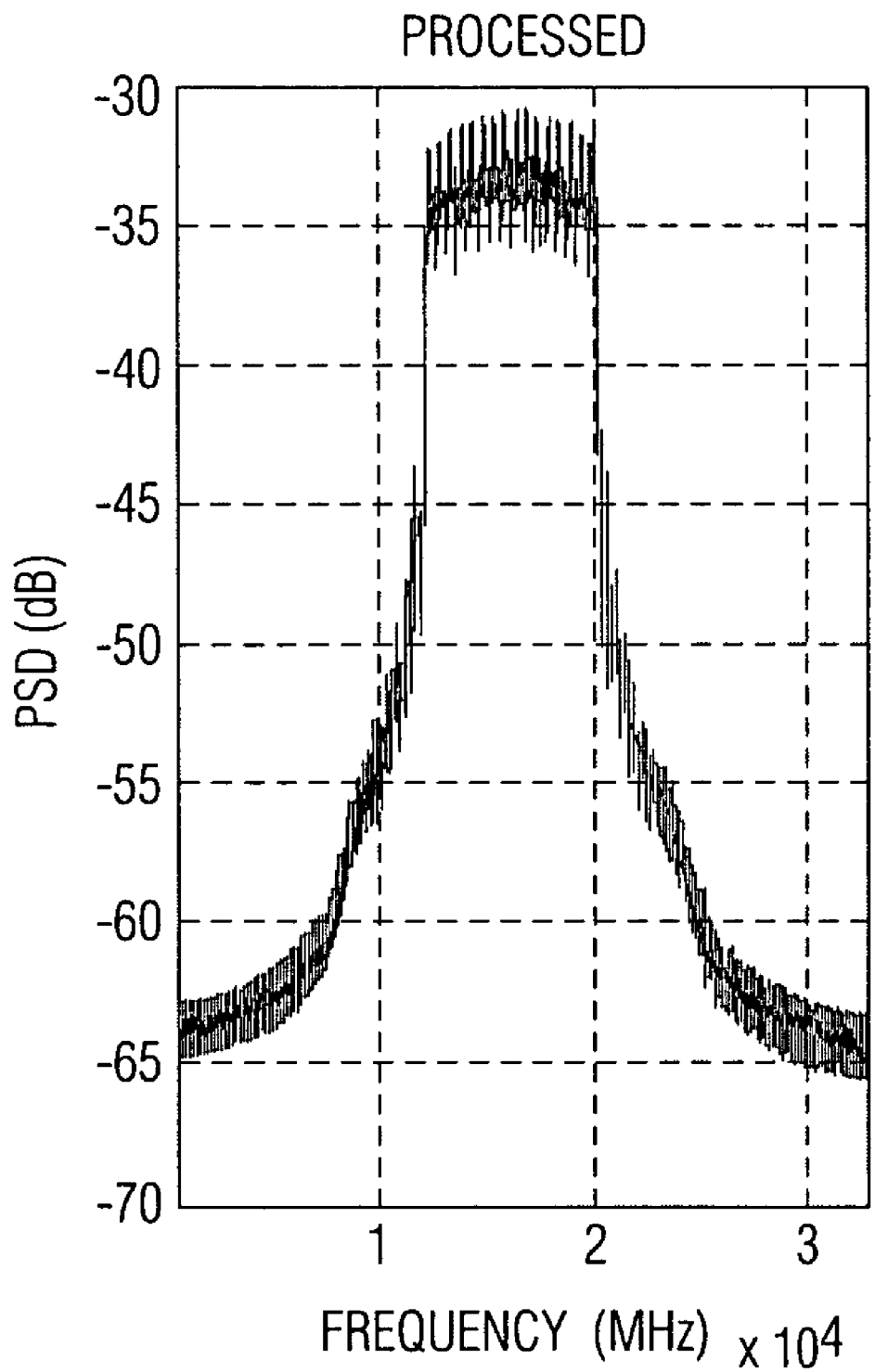
Figure 7A:
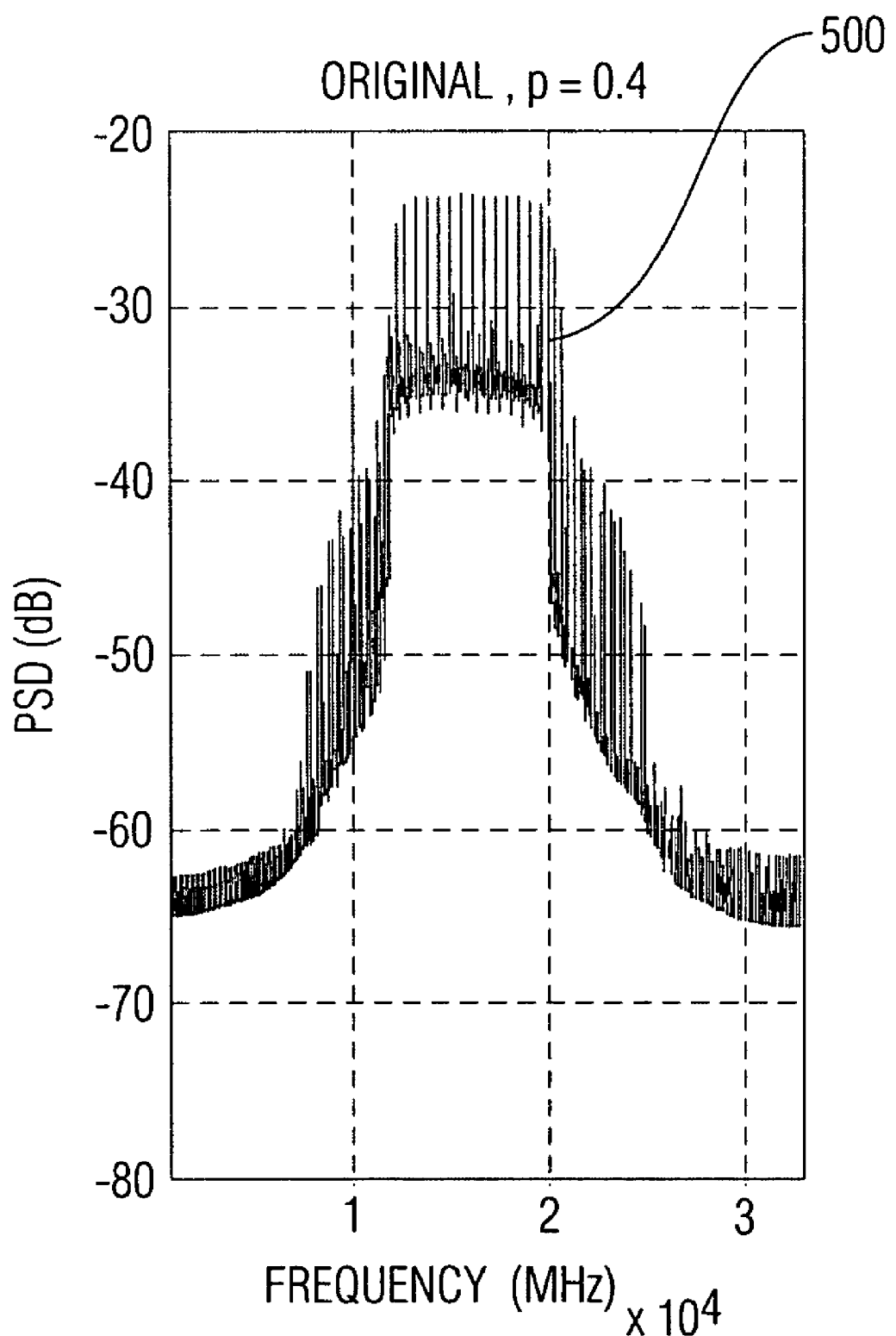
Figure 7B:
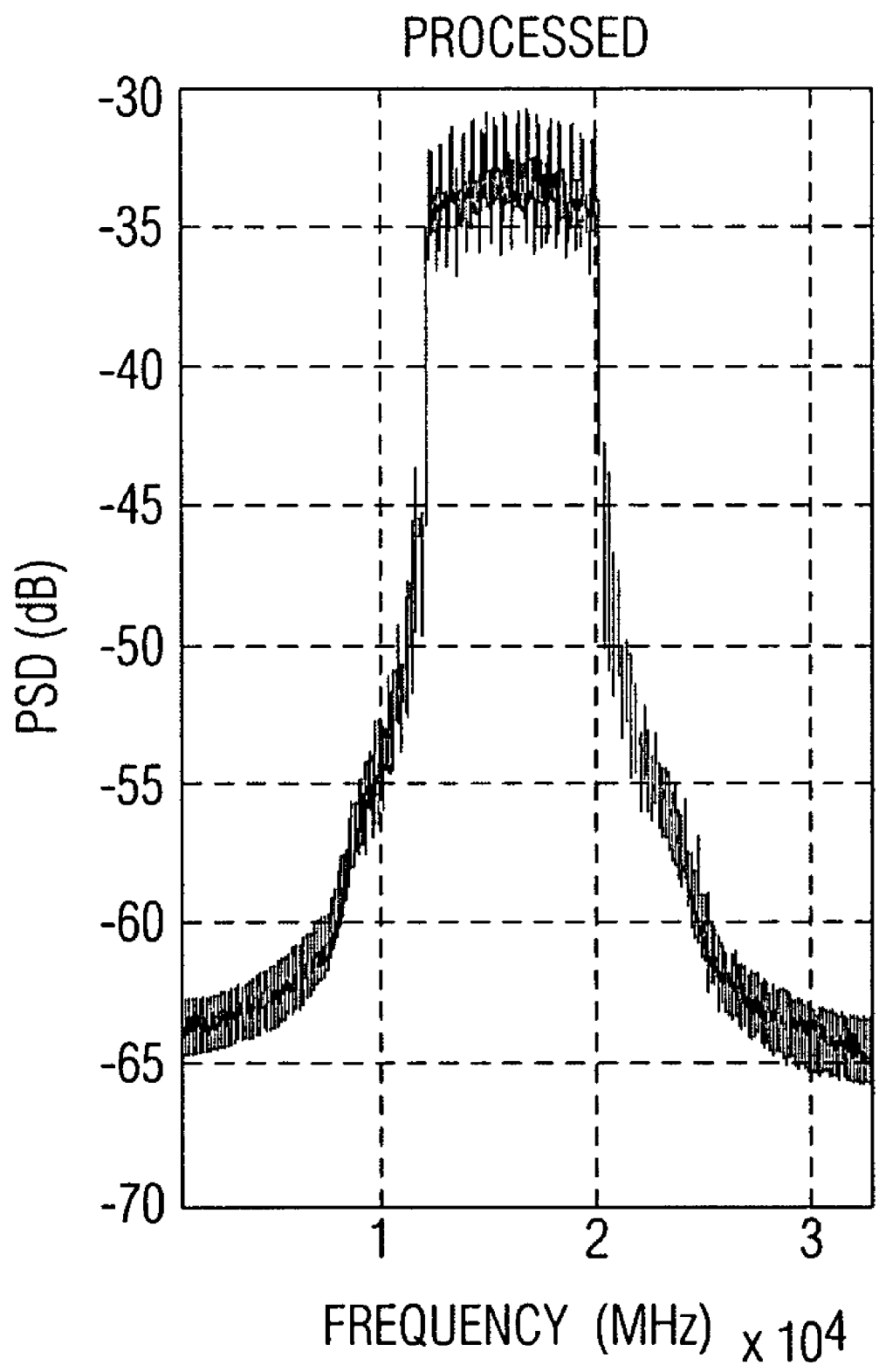
Figure 8A:
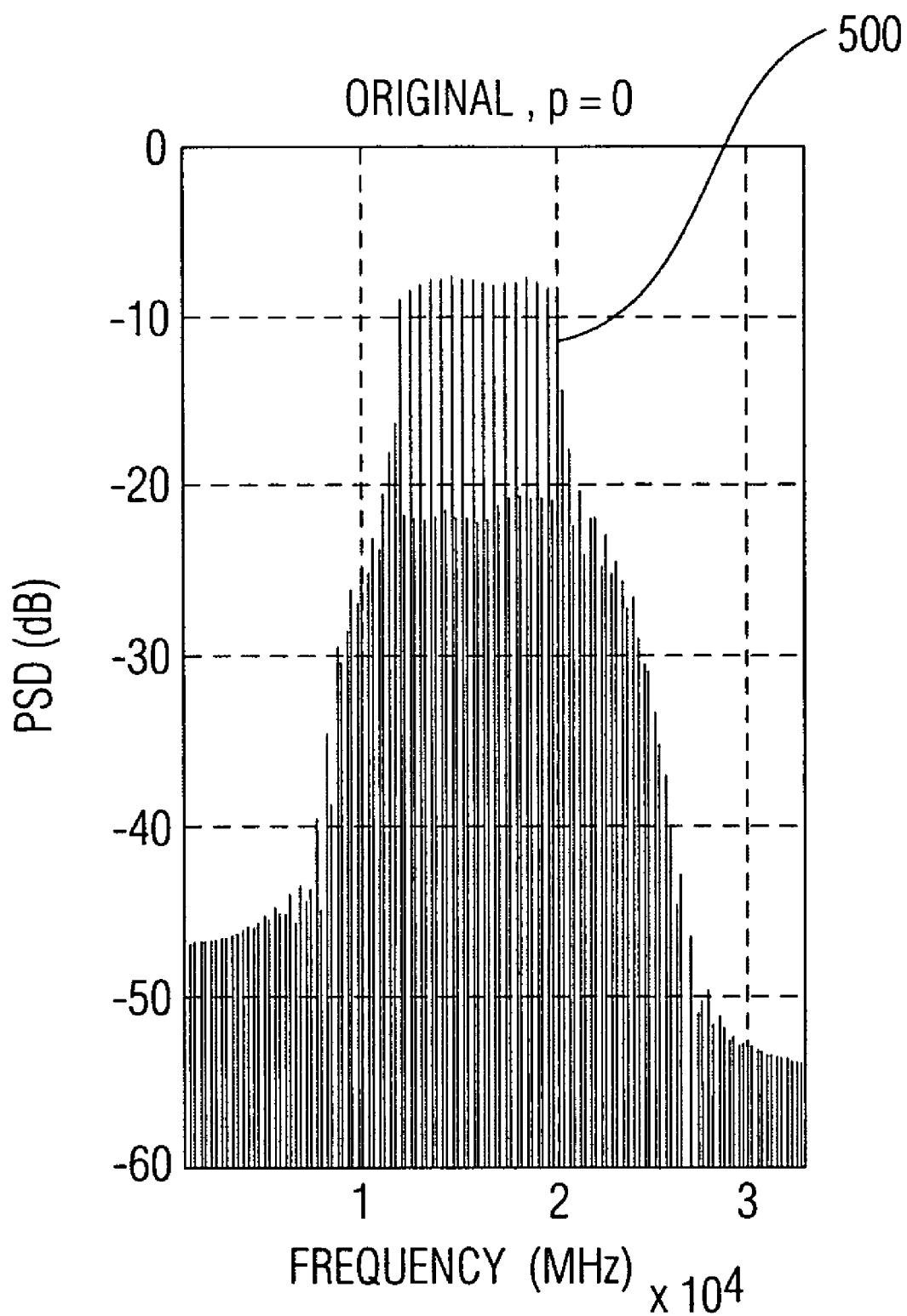
FIGS. 8A, 9A, and 10A are graphs depicting PSD versus frequency for source data with 0%, 25%, and 40% of a particular data value, respectively, processed using multi-band OFDM with QPSK modulation in accordance with the prior art.
Figure 8B:
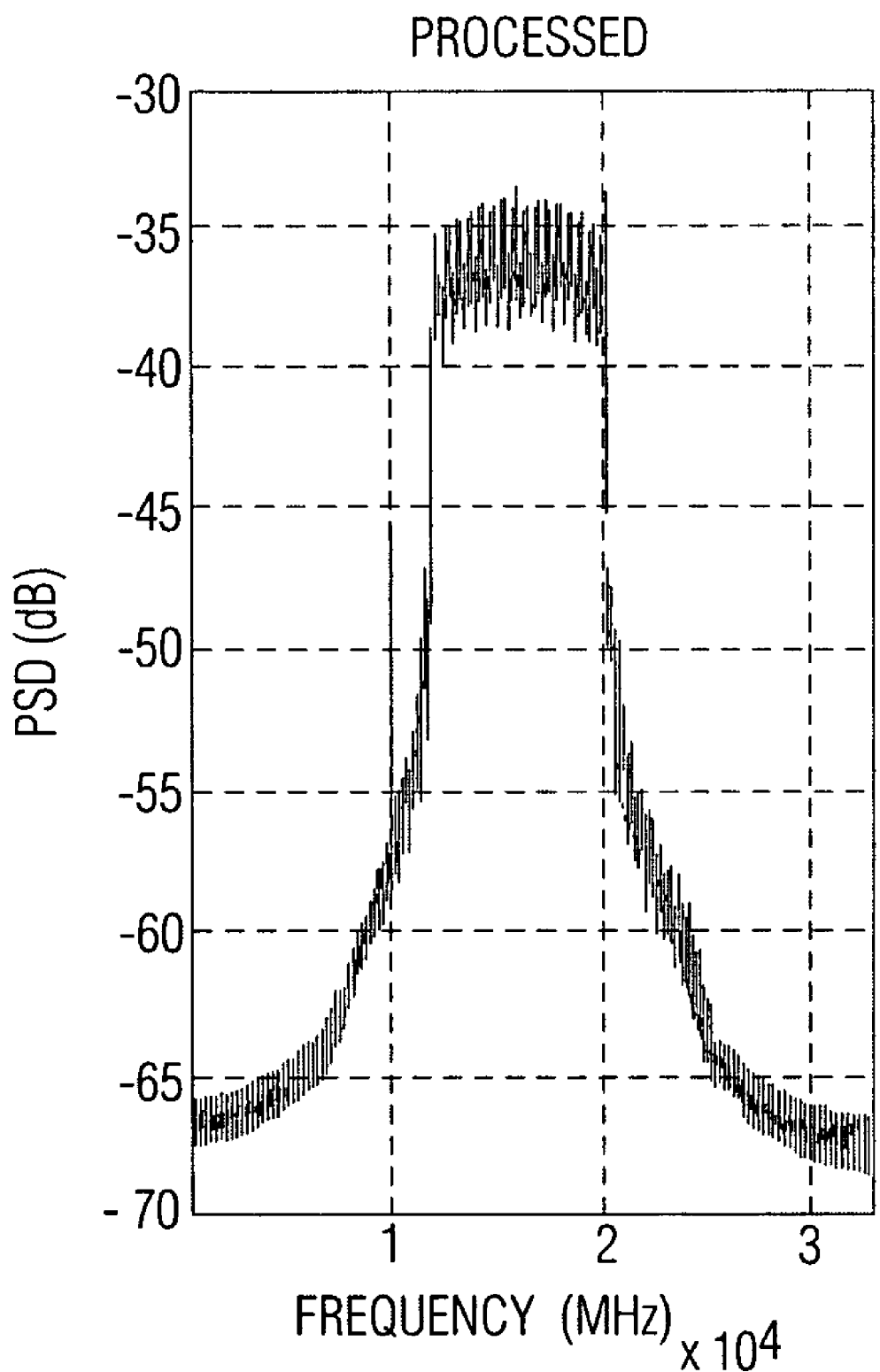
FIGS. 8B, 9B, and 10B are graphs depicting PSD versus frequency for source data with 0%, 25%, and 40% of a particular data value, respectively, processed using multi-band OFDM with QPSK modulation and selective inversion in accordance with the present invention.
Figure 9A:
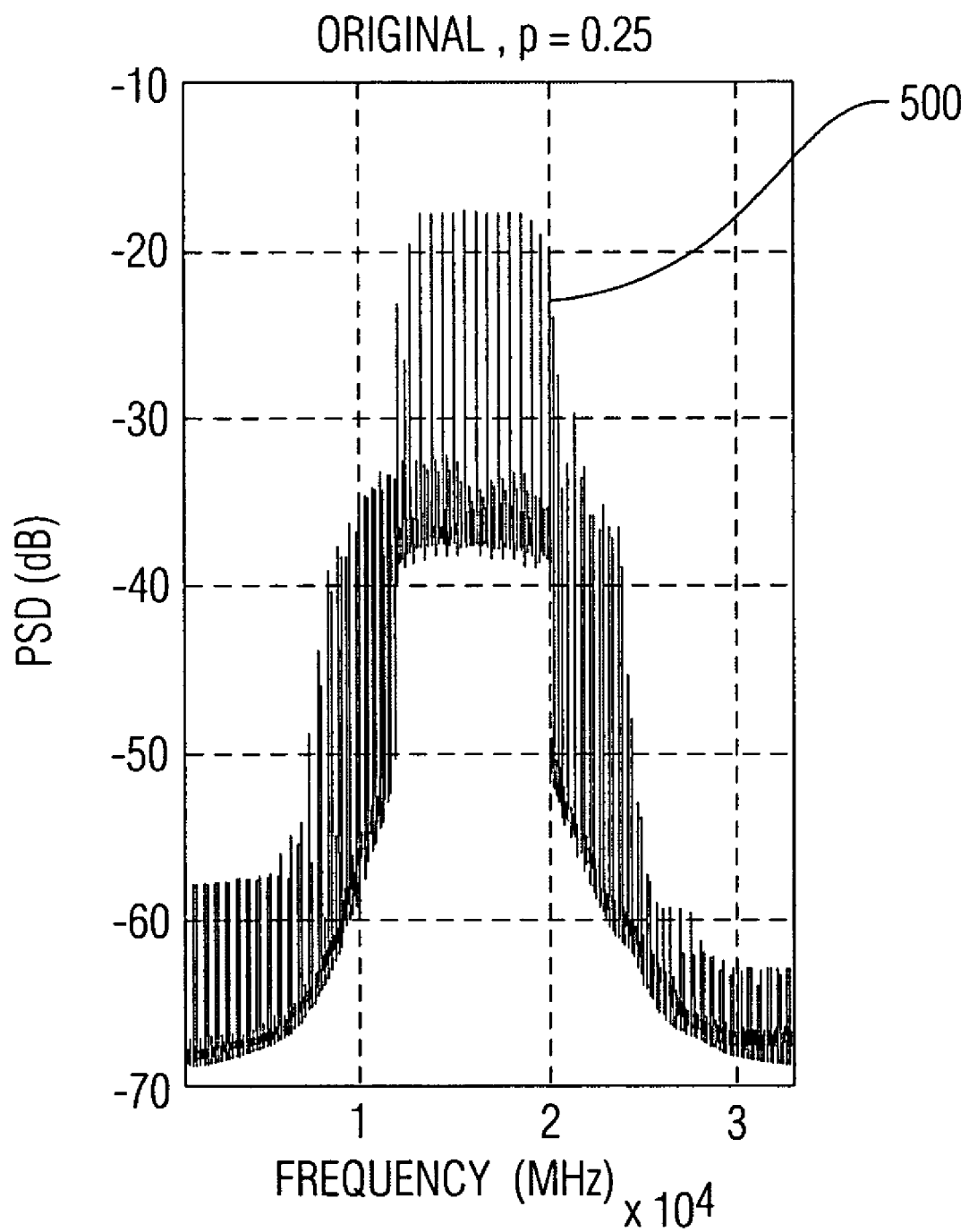
Figure 9B:
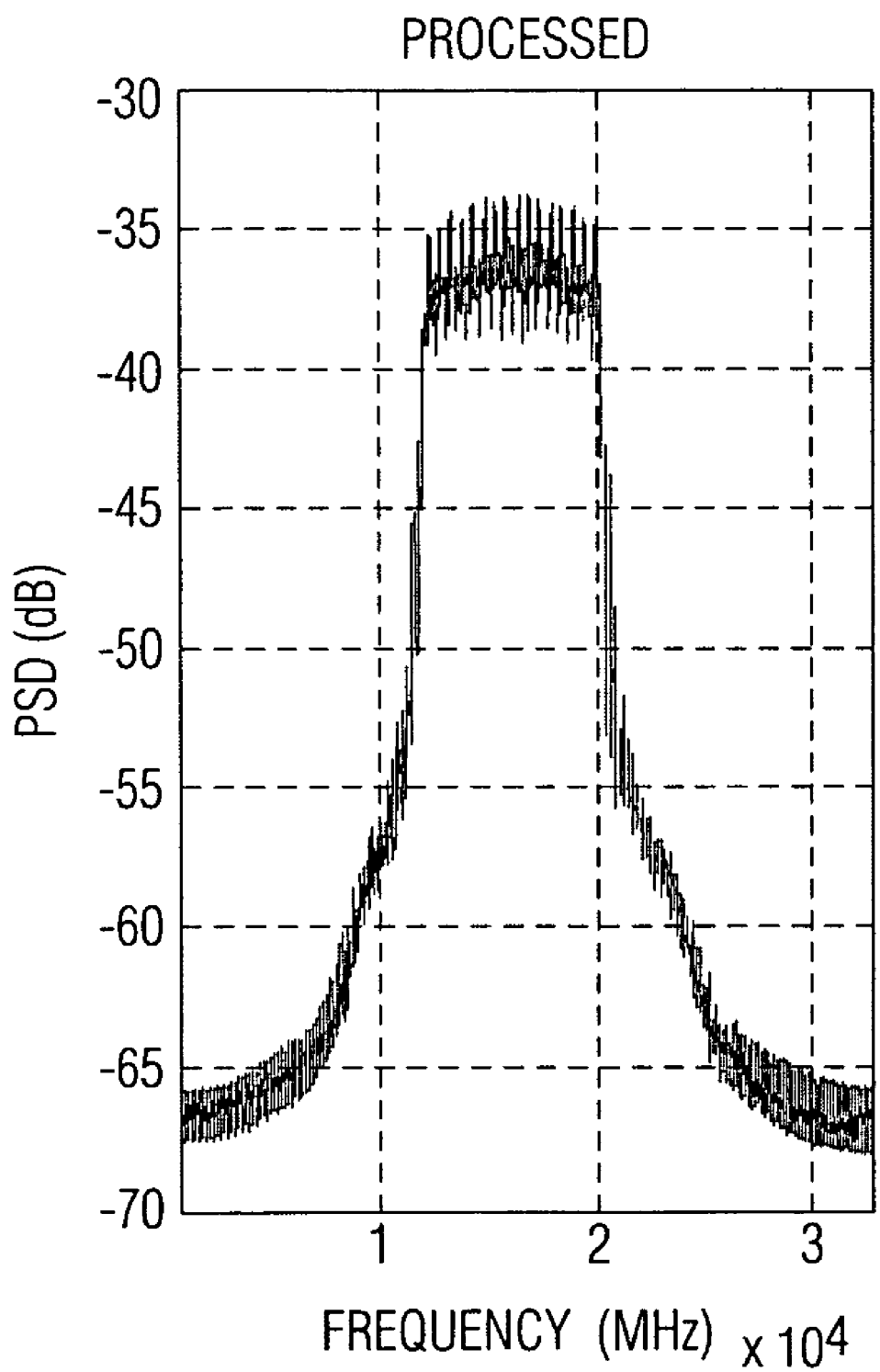
Figure 10A:
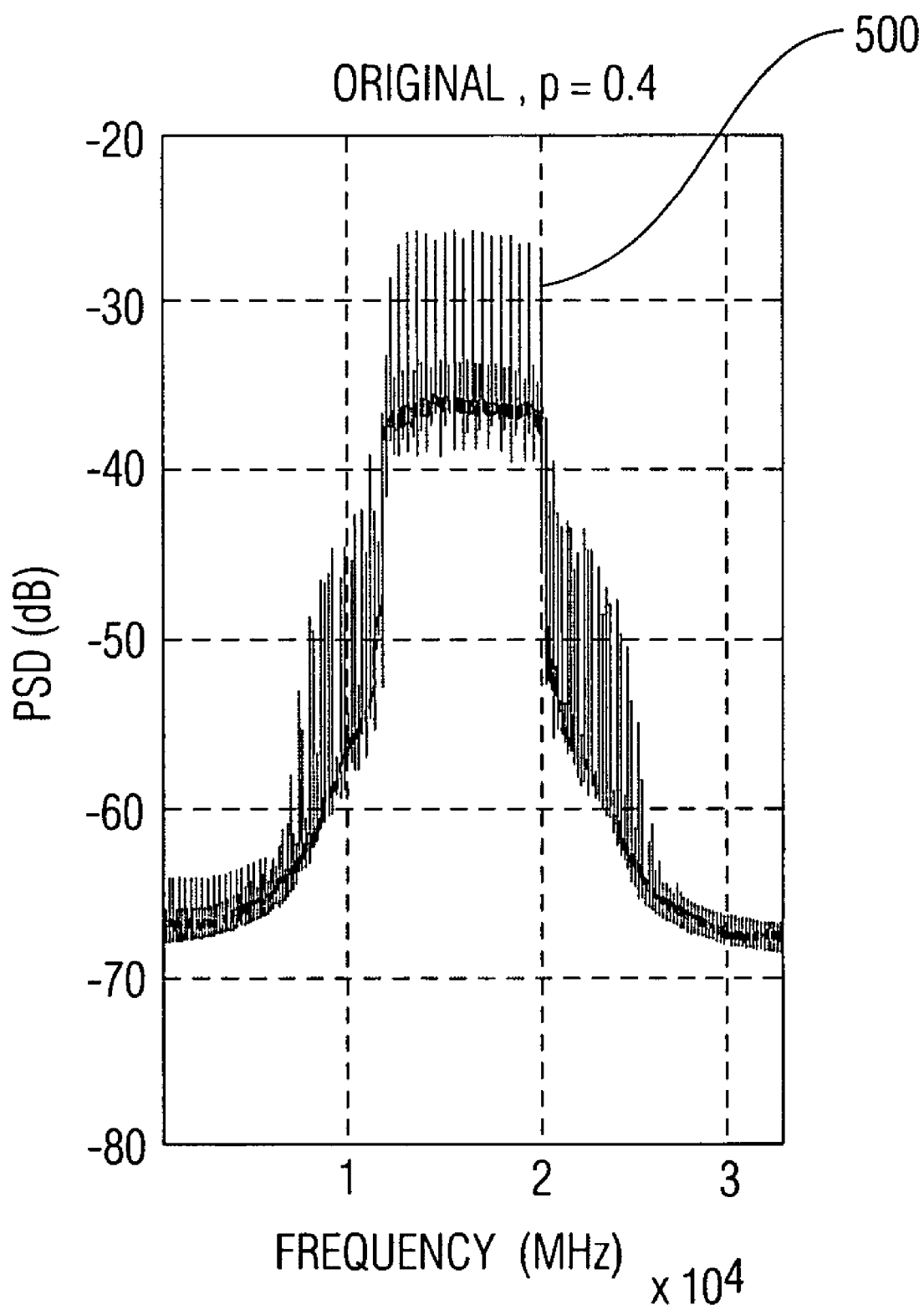
Figure 10B:
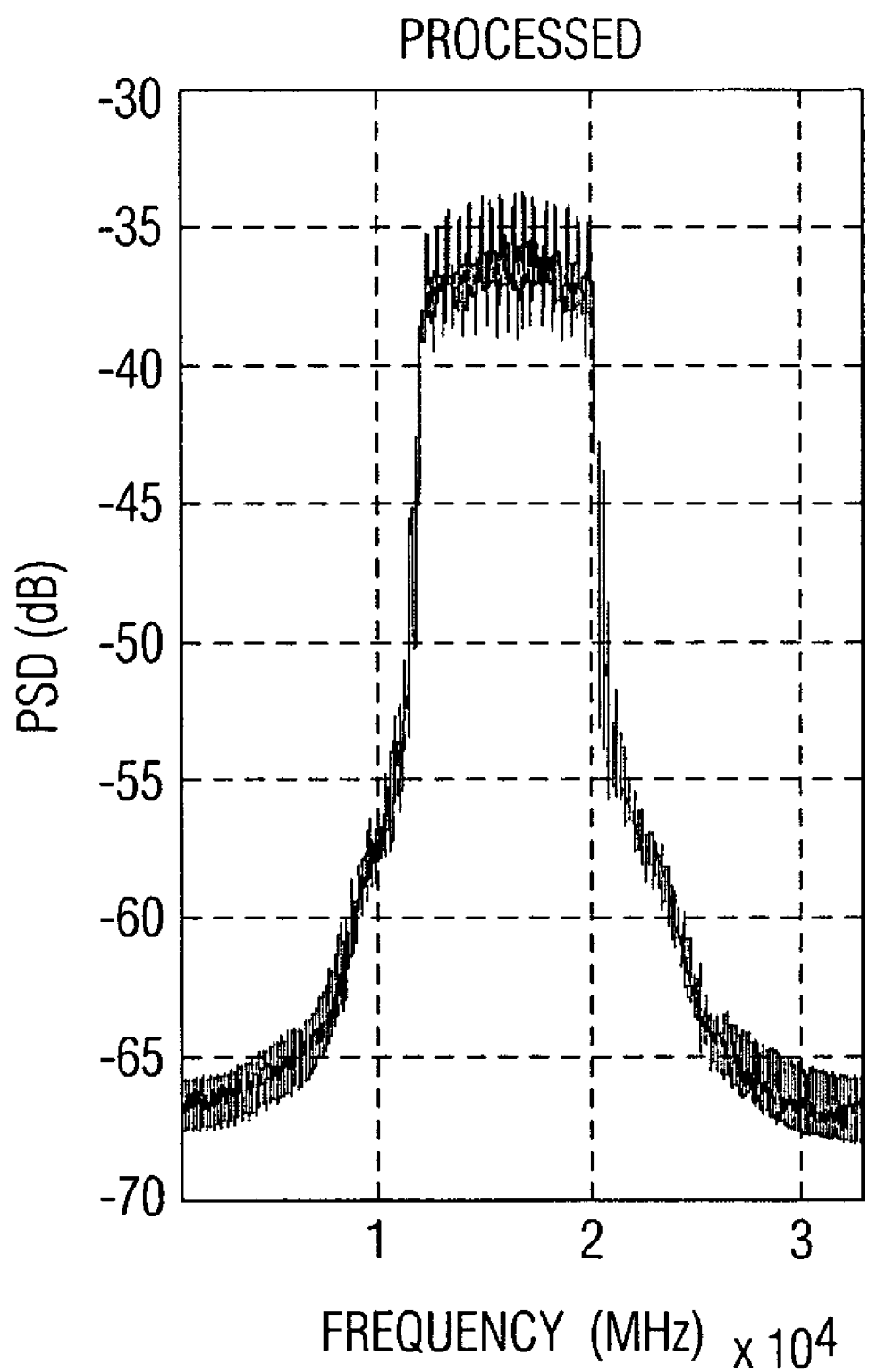

The configuration for the simulations is shown in FIG. 4. The simulations use known Periodogram PSD estimators to calculate the PSD of different UWB signals with only one sub-band used in the simulations. Each OFDM symbol consists of 16 carriers represented by 160 samples including a cyclic prefix followed by 96 samples of zero padding as a guard time. One frame contains 256 symbols. FFT is performed on frames, i.e., 64K-point FFT on 64K samples to evaluate the PSD. Because a single estimate usually generates a large bias in estimation and the Federal Communication Commission (FCC) UWB regulations set a limit on average PSD, 100 runs are used to smooth the final PSD estimate.

Results of the simulations are shown in the graphs of FIGS. 5 to 10 depicting PSD versus frequency, with figures designated with a capital A depicting the PSD generated using original data, e.g., $\{a_{n,m,k}\}$, and figures designated with a capital B depicting the PSD generated using data with selective reversion/inversion in accordance with the present invention, e.g., $\{c_{n,m,k}\}$. FIGS. 5A and 5B, 6A and 6B, and 7A and 7B provide a PSD comparison for source data having 0%, 25%, and 40% of a particular data value (e.g., a value of one (1)), respectively, processed using multi-band OFDM with BPSK modulation. FIGS. 8A and 8B, FIGS. 9A and 9B, and FIGS. 10A and 10B provide a PSD comparison for source data having 0%, 25%, and 40% of a particular data value (e.g., a value of one (1)), respectively, processed using multi-band OFDM with QPSK modulation.

The graphs illustrate that in existing multi-band OFDM UWB communication systems:

Line spectra 500 will appear if original data $\{a_{n,m,k}\}$ is not evenly distributed regardless of whether BPSK or QPSK is used;

Selective phase inversion/reversion performed on original data can remove/reduce spectra lines. For example, the peak value of PSD is reduced from about −4.8 dB, −14 dB, and −23 dB to about −31 dB for BPSK modulation shown in FIGS. 5 to 7, respectively, and from about −7.8 dB, −17 dB, and −26 dB to about −34 dB for QPSK modulation shown in FIGS. 8 to 10, respectively; and Regardless of the PSD of the original data, the PSD of processed data is similar, i.e., −31 dB for BPSK modulation and −34 for QPSK modulation.

Selective inversion for an IEEE 802.15.3a application is now described in which selective inversion is applied to frames and is referred to a random frame reversion (RFR). The IEEE 802.15.3a standard utilizes an IEEE 802.15.3 MAC and the maximal frame length is 2 KByte. Assuming a 16 Mbps bandwidth stream is used, the minimal pulse repetition frequency (PRF) of frames is represented by equations 9.

$$16M/(2K*8)=1K$$

$$T_f=10^{-3} \quad (9)$$

Because $T_f \ll 1$, non-payload data will generate discrete PSD components resulting in strong spectra lines. Table 4 lists values that the non-payload data contributes to the PSD under the assumption that $T_f=10^{-3}$, where $p_{st}$ is the percentage of non-payload data in a data stream. Table 4 indicates that although non-payload data constitutes a small portion of a frame, its contribution to PSD cannot be neglected due to the high PRF of the frames. If a smaller frame length is used in a harsh environment to reduce frame error rates, the same percentage of non-payload data will generate stronger spectral lines and more PSD than those listed in Table 4.

TABLE 4

| $p_{st}$ | $\Delta$PSD (dB) |
|---|---|
| 0.1% | 3.01 |
| 0.5% | 7.78 |

TABLE 4-continued

| $p_{st}$ | $\Delta$PSD (dB) |
|---|---|
| 1% | 10.41 |
| 5% | 17.07 |
| 10% | 20.04 |

RFR can reduce the discrete PSD component generated by non-payload data, which is not scrambled, and payload data. For simplicity, a framed data stream can be expressed as shown in equation 10.

$$s(t) = \sum_{l=-\infty}^{\infty} \sum_{k=1}^{K} a_{l,k} w(t - lT_f - kT_p) \quad (10)$$

where l and k are index values of frames and pulses within the frames.

To reduce the discrete PSD component in an IEEE 802.15.3a system, first, a random sequence $\{b_n\}$ is generated with an evenly distributed function as shown in equation 11.

$$Pr\{b_n\} = \begin{cases} 0.5, & b_n = 1 \\ 0.5, & b_n = -1 \end{cases} \quad (11)$$

Second, an operation shown in equation 12 is applied to data and the random sequence to produce a new sequence, $\{c_{l,k}\}$ for transmission.

$$c_{l,k} = \begin{cases} a_{l,k}, & b_l = 1 \\ -a_{l,k}, & b_l = -1 \end{cases} \quad (12)$$

Figure 11:
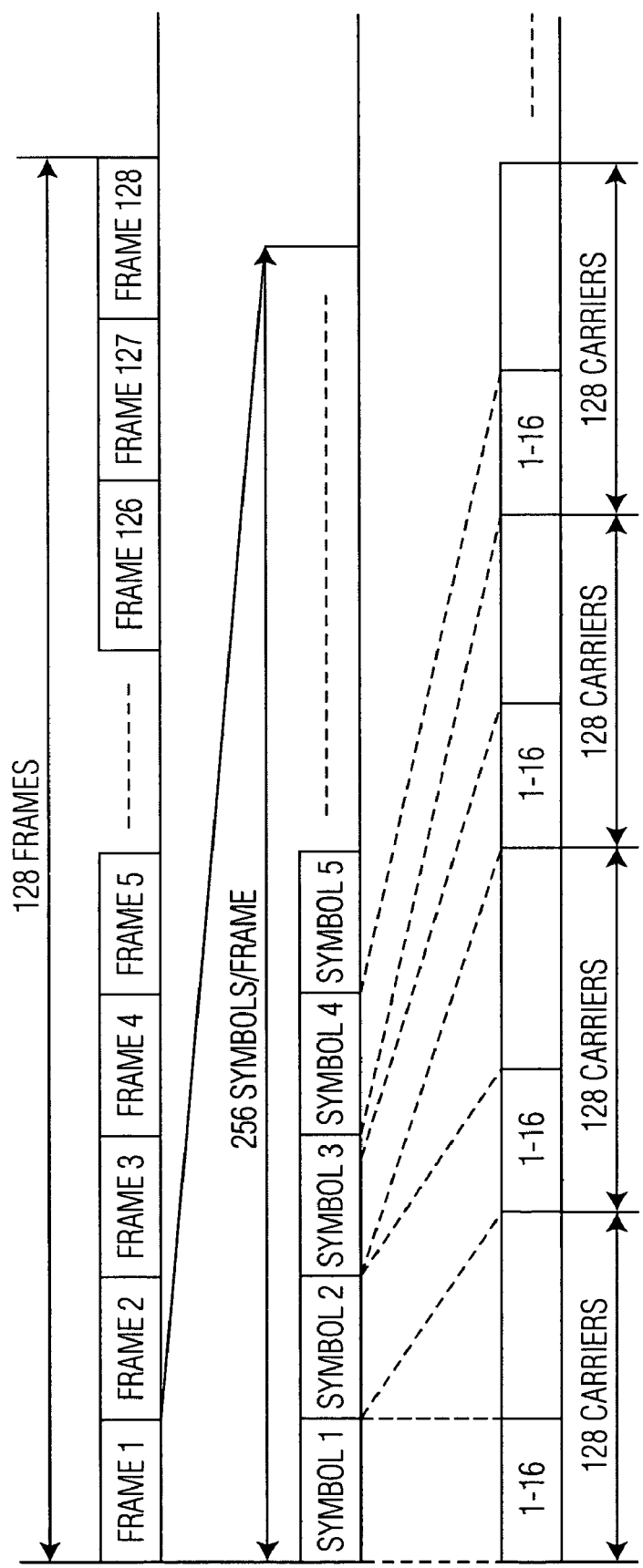
FIG. 11 is an illustration depicting the configuration of a scrambler in accordance with one aspect of the present invention.
Figure 12A:
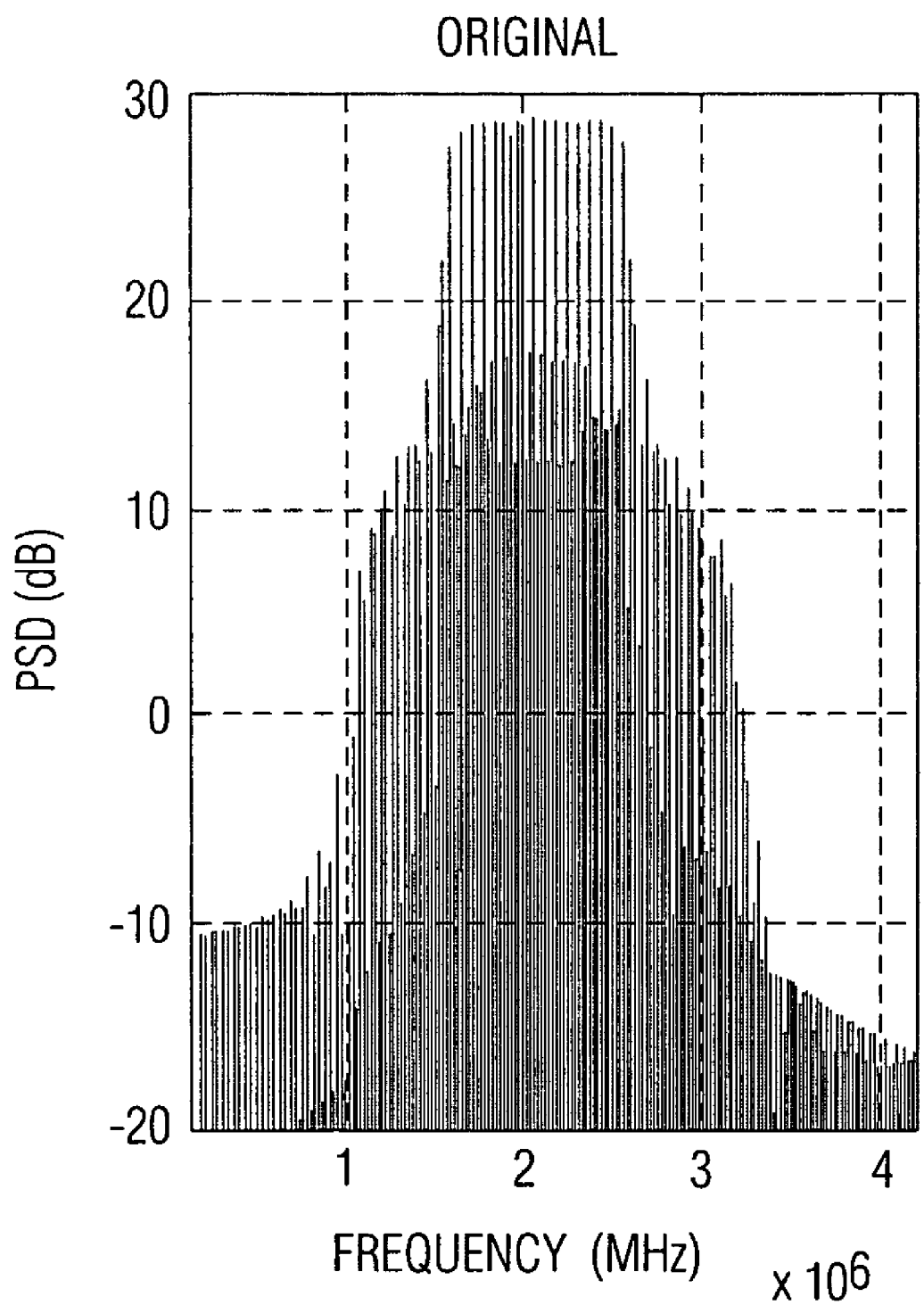
FIGS. 12A, 13A, 14A, and 15A are graphs depicting PSD versus frequency for source data that is scrambled using a 15 bit linear feedback shift register with four substantially correlated seeds, where the source data includes no non-payload data.
Figure 12B:
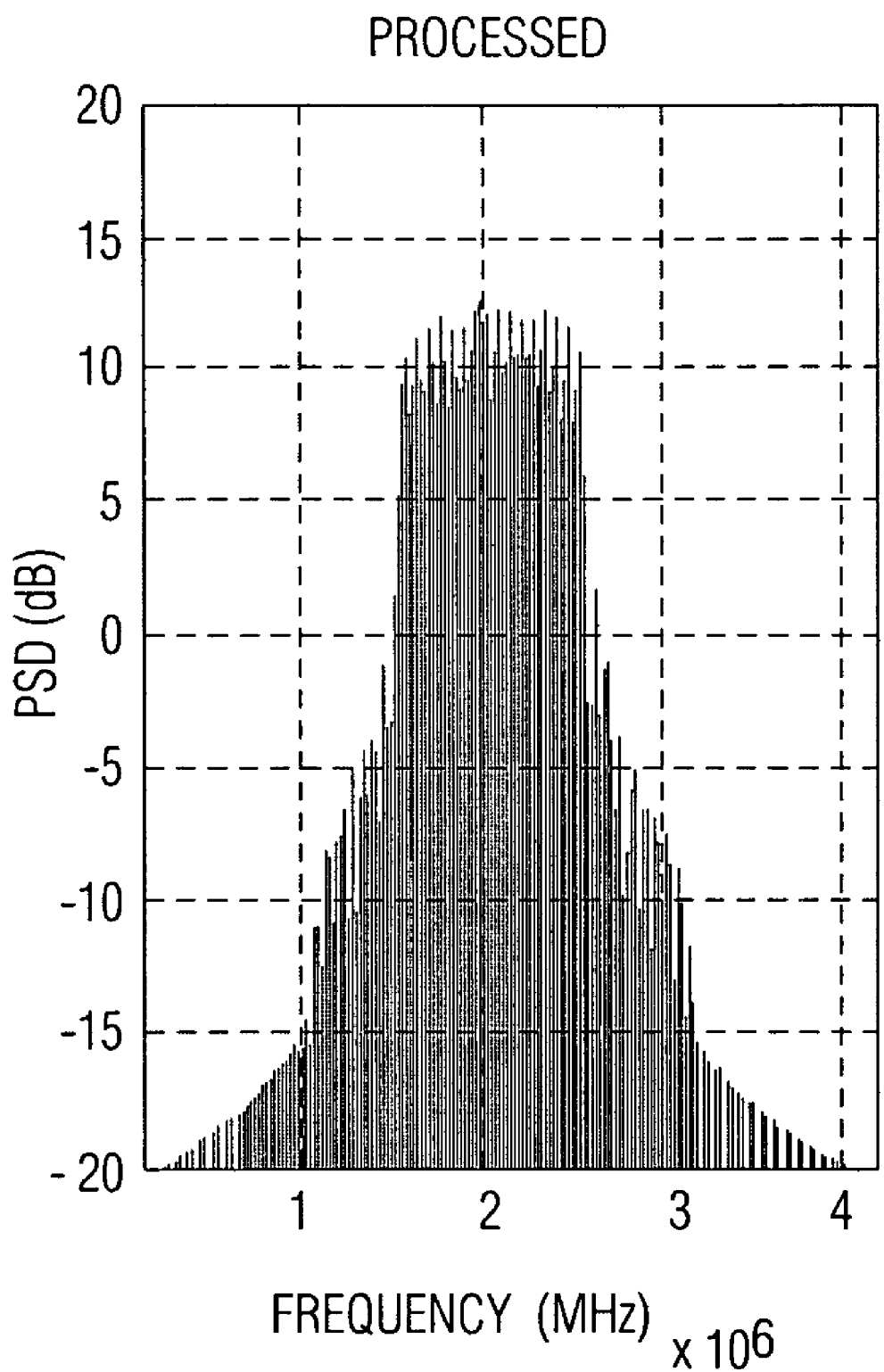
FIG. 12B is a graph depicting PSD versus frequency for source data that is scrambled using an LFSR-15 with substantially uncorrelated seeds in accordance with one aspect of the present invention, where the source data includes no non-payload data.

Scrambler simulations are now provided. FIG. 11 depicts the configuration used for the simulation. In the configuration, the frame rate is 128 frames/second and one frame contains 256 symbols. Each symbol has 16 carriers that come from the first 16 carriers in the 128 carriers that are used in the original multi-band OFDM UWB systems. The payload data are all "1"s to the scrambler and there is no non-payload data. The simulation results are shown in FIGS. 12A and 12B, where FIG. 12A depicts results using the original scrambler (e.g., a fifteen bit linear feedback shift register with four substantially correlated seeds (see Table 2)) and FIG. 12B depicts results using a fifteen bit linear feedback shift register with four substantially uncorrelated seeds generated by MATLAB rando function. The result show that the scrambler with four new uncorrelated seeds reduces the PSD by about 16 dB over the scrambler with the four original correlated seeds.

Figure 13A:
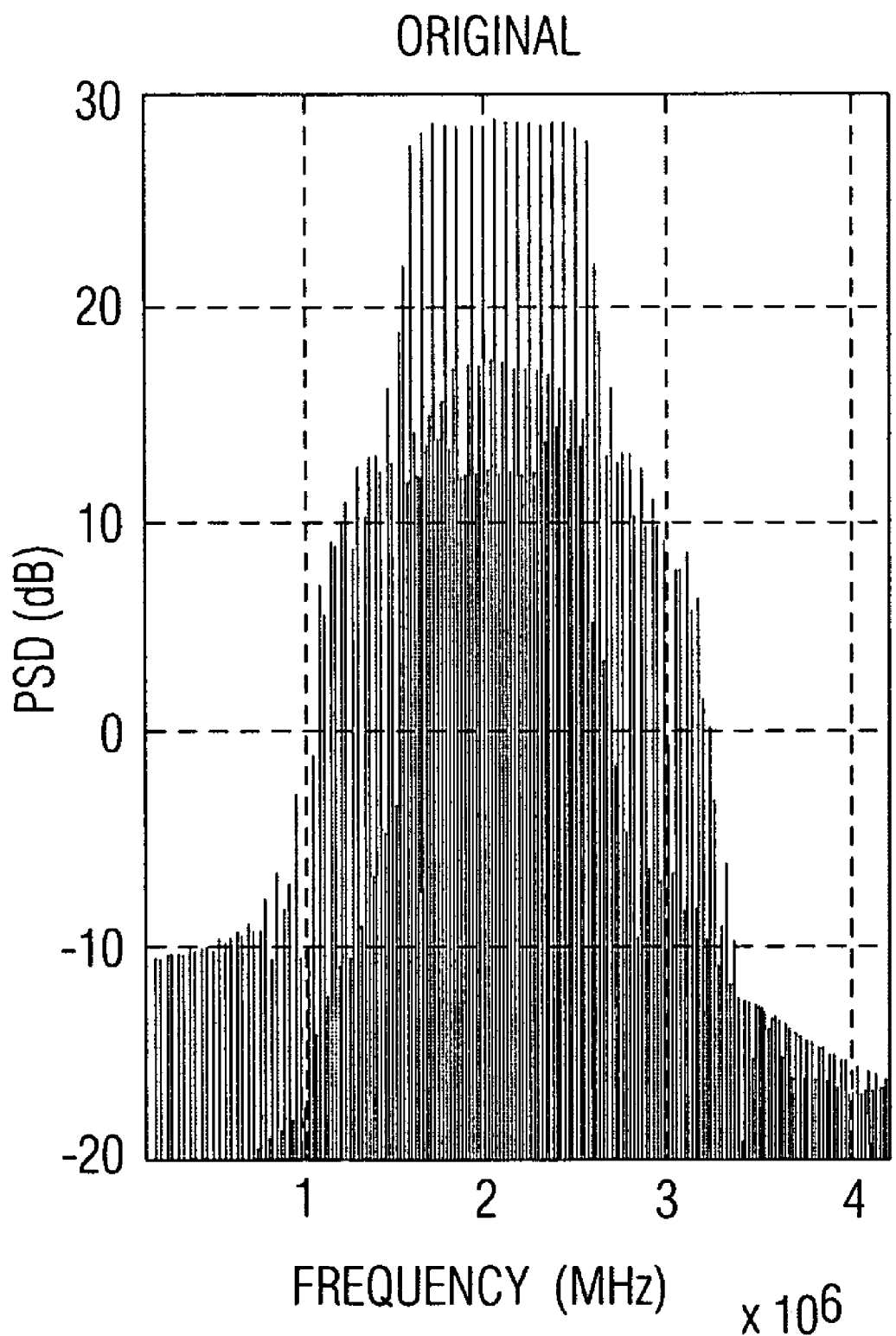

As shown in FIG. 12B, strong spectra lines still exist using a fifteen bit linear feedback shift register with four substantially uncorrelated seeds. These lines are associated with the relatively short length of the linear feedback shift register. To further reduce these lines, a longer polynomial generator, e.g., a twenty eight bit linear feedback shift register, may be used. The results shown in FIG. 13A are achieved using an original scrambler, e.g., LFSR-15 with four original correlated seeds and the results shown in FIG. 13B are achieved using a new 28 bit linear feedback shift register with four new substantially uncorrelated seeds.

Figure 13B:
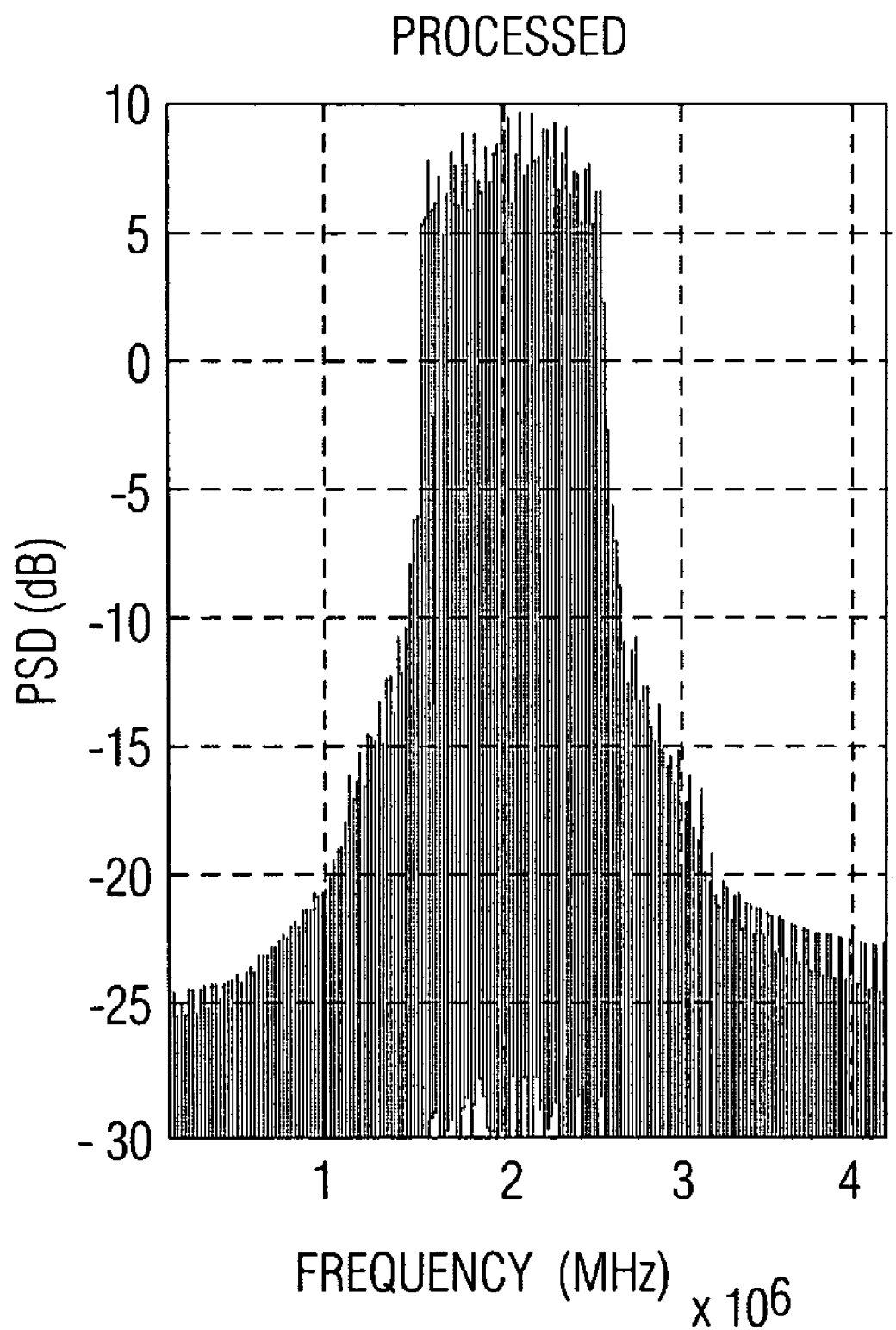
FIG. 13B is a graph depicting PSD versus frequency for source data that is scrambled using a 28 bit linear feedback shift register (LFSR-28) with substantially uncorrelated seeds in accordance with one aspect of the present invention, where the source data includes no non-payload data.

Results in FIG. 12B and FIG. 13B show that using and LFSR-28 reduces the PSD by about an additional 3 dB.

Figure 14A:
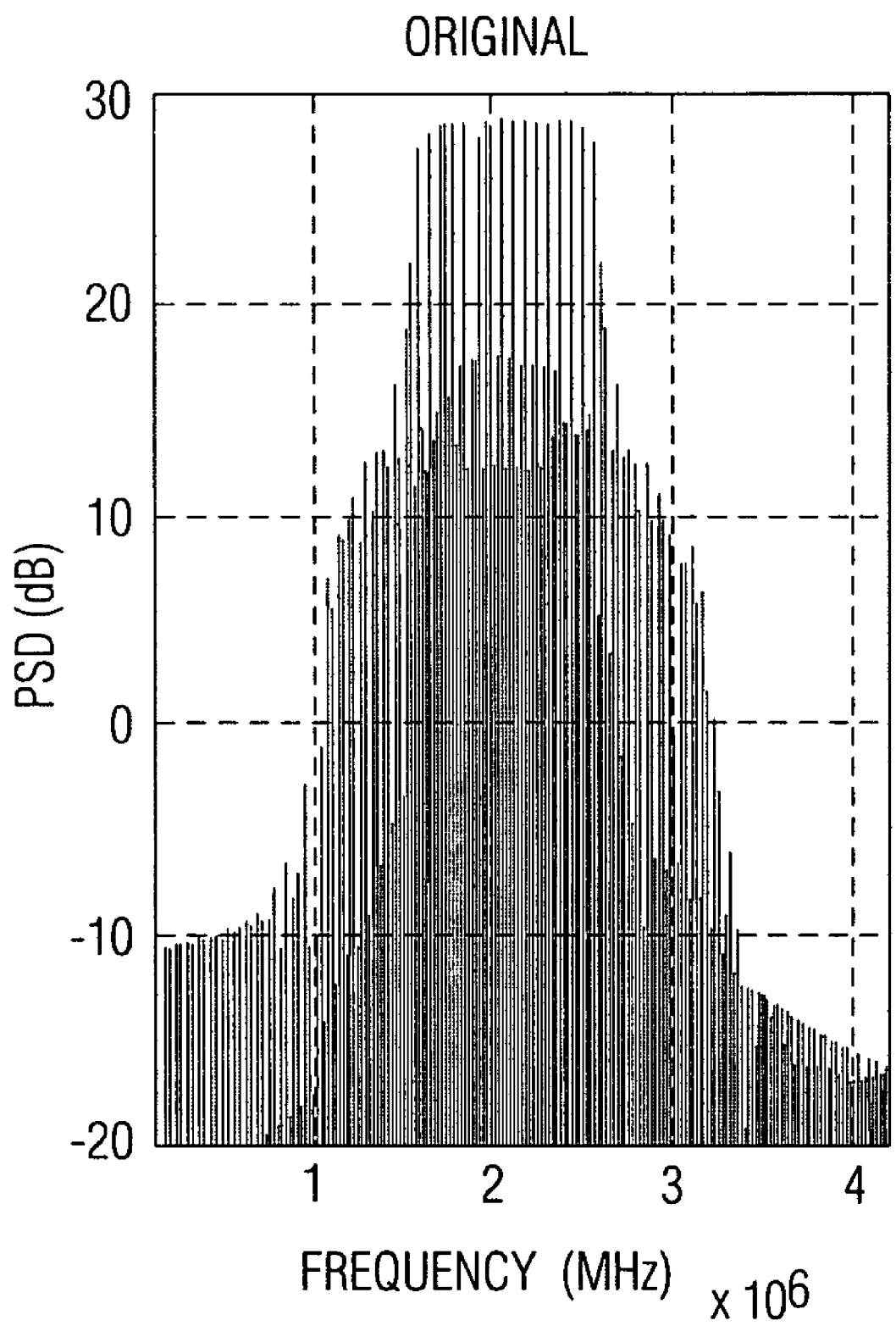
Figure 14B:
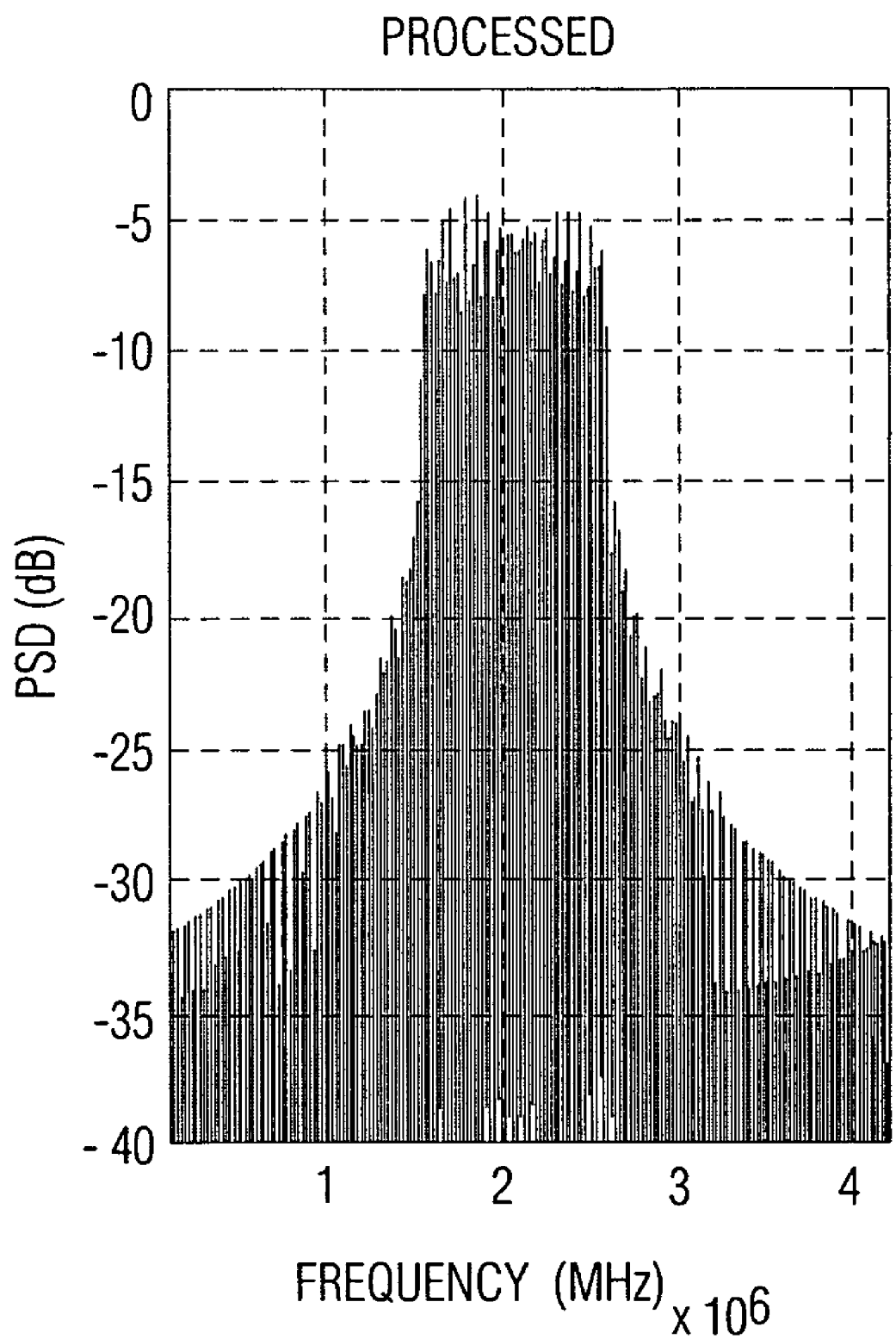
FIG. 14B is a graph depicting PSD versus frequency for source data that is selectively inverted and scrambled using an LFSR-15 with substantially uncorrelated seeds in accordance with one aspect of the present invention, where the source data includes no non-payload data.
Figure 15A:
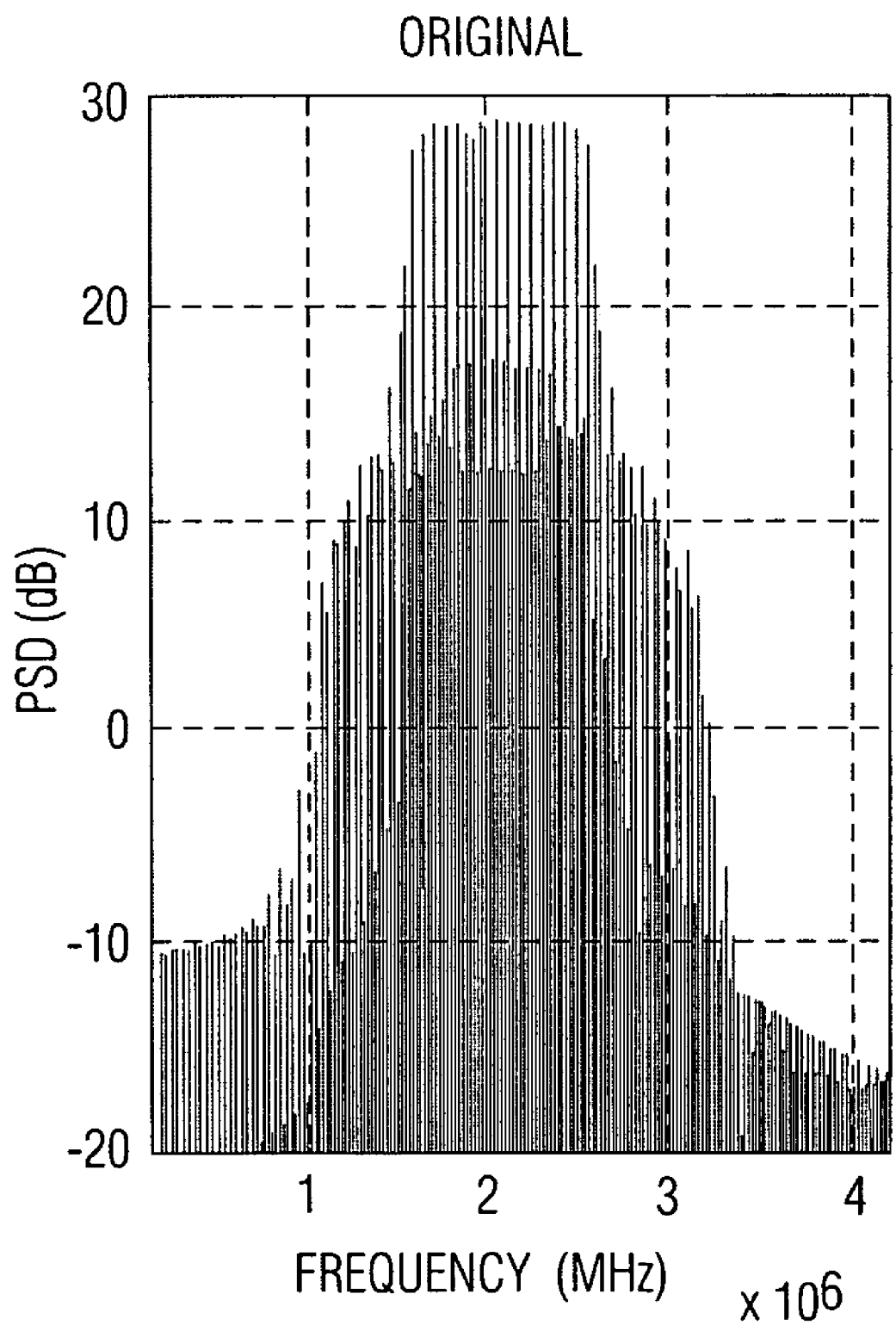
Figure 15B:
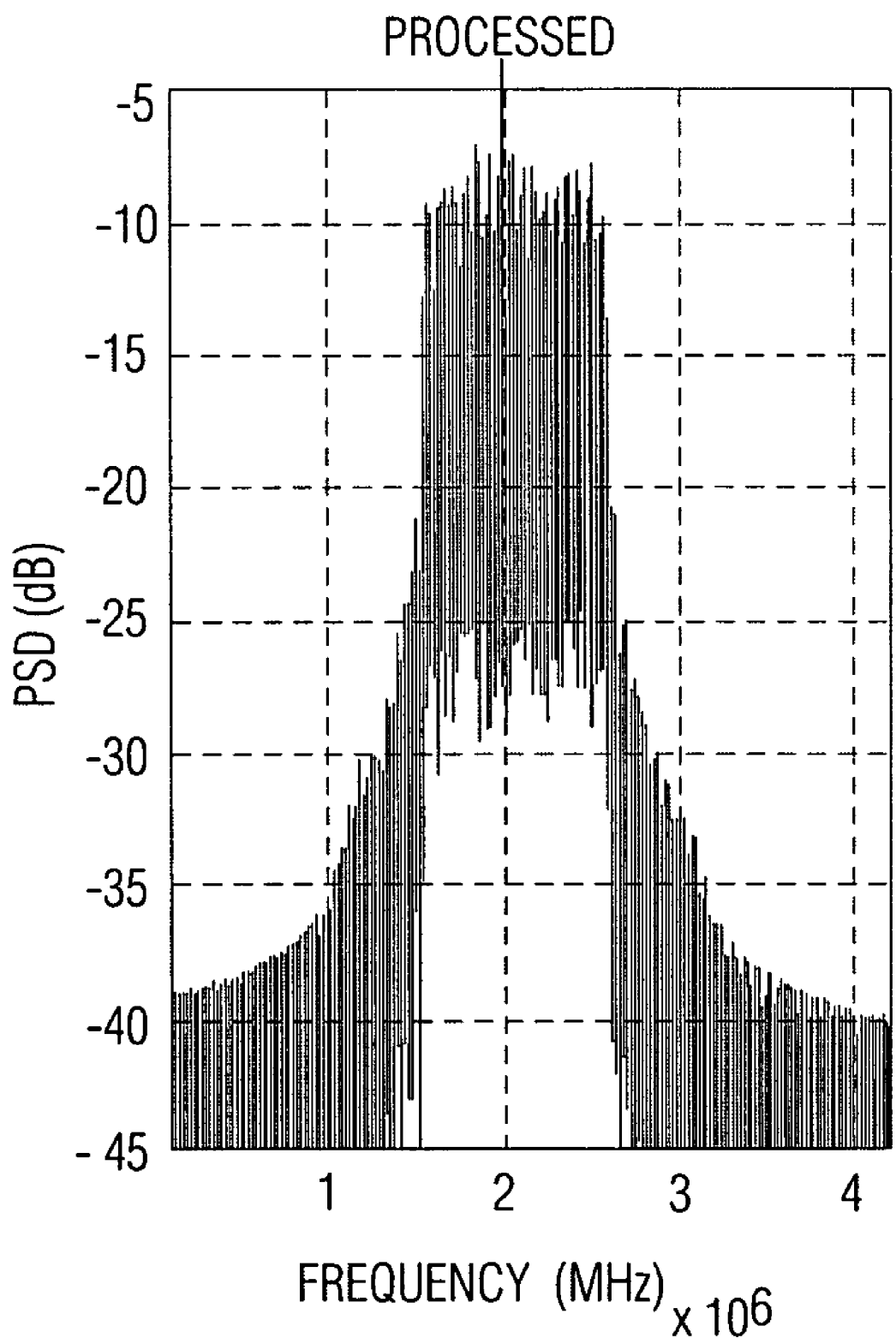
FIG. 15B is a graph depicting PSD versus frequency for source data that is selectively inverted and scrambled using a 28 bit linear feedback shift register (LFSR-28) with substantially uncorrelated seeds in accordance with one aspect of the present invention, where the source data includes no non-payload data.

Additional simulations are now provided in which the payload data are all "1"s to the scrambler and the non-payload data comprises about 3.1% of the frame. FIG. 14A shown the PSD of data processed by the original scrambler (i.e., LFSR-15 with four substantially correlated seeds) and FIG. 14B shows the PSD of data processed by LFSR-15 with four substantially uncorrelated seeds and RFR. FIG. 15A shown the PSD of data processed by the original scrambler (i.e., LFSR-15 with four substantially uncorrelated seeds) and FIG. 15B shows the PSD of data processed by the LFSR-28 using four substantially uncorrelated seeds and with RFR. The four substantially uncorrelated seeds are generated by MATLAB rando function. Results in FIG. 14B and FIG. 15B show that the new scheme reduces the discrete PSD components of UWB signals significantly, i.e., about 34 dB and 37 dB, respectively, over current systems.

The simulation results show that spectral lines due to discrete PSD components are an issue for multi-band OFDM UWB signals. Methods and apparatus are described for base-band processing to reduce/remove the spectral lines, thereby reducing the peak value of the PSD of multi-band OFDM UWB signals. The simulation results confirm the effectiveness of these methods and apparatus in suppressing the discrete components of the PSD of multi-band OFDM UWB signals.

Although the components of the present invention have been described in terms of specific components, it is contemplated that one or more of the components may be implemented in software running on a computer. In this embodiment, one or more of the functions of the various components may be implemented in software that controls the computer. This software may be embodied in a computer readable carrier, for example, a magnetic or optical disk, a memory-card or an audio frequency, radio-frequency or optical carrier wave. The computer may be a general or specific purpose computer, an application specific integrated circuit (ASIC), state machine, or essentially any device capable of processing signals as described herein.

Further, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for processing source data for transmission over a wideband signal such that the wideband signal has reduced discrete power spectral density (PSD) components, the wideband signal including wideband signal pulses, the method comprising the steps of:
   generating data symbols responsive to the source data;
   transforming one or more of the data symbols into a frame including one or more orthogonal frequency division multiplexing (OFDM) symbols;
   selectively inverting one or more individual OFDM symbols within the frame responsive to a random data sequence; and
   modulating the wideband signal pulses of the wideband signal with the selectively inverted frame of OFDM symbols.

2. The method of claim 1, wherein the source data includes bits and the generating step comprises the step of:
   mapping bits of the source data to the data symbols using one of (i) binary phase shift keying and (ii) quadrature phase shift keying.

3. The method of claim 1, wherein the data symbols are in a frequency domain and wherein the transforming step comprises the step of:
   transforming the one or more data symbols from the frequency domain to a time domain to produce the frame including the OFDM symbols.

4. The method of claim 1, further comprising the step of:
   scrambling the source data prior to the generating step.

5. The method of claim 4, wherein the scrambling step comprises the step of:
   scrambling the source data using a linear feedback scheme initialized using substantially uncorrelated seeds.

6. The method of claim 1, wherein the wideband signal is an ultra wideband signal including ultra wideband signal pulses and wherein the modulating step comprises the step of:
   modulating the ultra wideband signal pulses of the ultra wideband signal with the selectively inverted frame of OFDM symbols.

7. The method of claim 1, wherein the wideband signal is a multi-band wideband signal including wideband signal pulses and wherein the modulating step comprises the step of:
   modulating the wideband signal pulses corresponding to at least one sub-band of the multi-band wideband signal with the selectively inverted frame of OFDM symbols.

8. An apparatus for processing source data for transmission over a wideband signal such that the wideband signal has reduced discrete power spectral density (PSD) components, the wideband signal including wideband signal pulses, the apparatus comprising:
   a mapper configured to generate data symbols responsive to the source data;
   a transformer coupled to the mapper, the transformer configured to transform one or more data symbols into a frame including one or more orthogonal frequency division multiplexing (OFDM) symbols;
   an inverter coupled to the transformer, the inverter configured to selectively invert one or more individual OFDM symbols within the frame of OFDM symbols; and
   a wideband transmitter coupled to the inverter, the wideband transmitter configured to modulate the wideband signal pulses of the wideband signal with the selectively inverted frame of OFDM symbols.

9. The apparatus of claim 8, further comprising:
   a scrambler coupled to the mapper, the scrambler configured to scramble the source data prior to mapping the source data to the data symbols.

10. The apparatus of claim 9, wherein the scrambler comprises:
    a linear feedback shift register configured for initialization using seed values; and
    a memory coupled to the linear feedback shift register, the memory including a set of seed values for initialing the linear feedback shift register wherein the seed values are substantially uncorrelated with respect to one another.

11. The apparatus of claim 8, wherein the wideband transmitter is a multi-band wideband transmitter.

12. The apparatus of claim 8, wherein the wideband transmitter is an ultra wideband transmitter.

13. The apparatus of claim 8, wherein the data symbols are in a frequency domain and the transformer is configured to transform the data symbols from the frequency domain into the frame of OFDM symbols in a time domain.

14. A system for processing source data for transmission over a wideband signal such that the wideband signal has reduced discrete power spectral density (PSD) components, the wideband signal including wideband signal pulses, the system comprising:
- means for generating data symbols responsive to the source data;
- means for transforming one or more of the data symbols into a frame including one or more orthogonal frequency division multiplexing (OFDM) symbols;
- means for selectively inverting one or more individual OFDM symbols within the frame responsive to a random data sequence; and
- means for modulating the wideband signal pulses of the wideband signal with the selectively inverted frame of OFDM symbol.

15. The system of claim 14, further comprising:
- means for scrambling the source data prior to the generating step.

16. A tangible computer readable storage medium including software that is configured to control a computer to implement a wideband signal processing method embodied in a computer readable medium for processing source data for transmission over a wideband signal such that the wideband signal has reduced discrete power spectral density (PSD) components, the wideband signal including wideband signal pulses, the processing method including the steps of:
- generating data symbols responsive to the source data;
- transforming one or more of the data symbols into a frame including one or more orthogonal frequency division multiplexing (OFDM) symbols;
- selectively inverting one or more individual OFDM symbols within the frame responsive to a random data sequence; and
- modulating the wideband signal pulses of the wideband signal with the selectively inverted frame of OFDM symbols.

17. The tangible computer readable storage medium of claim 16, wherein the method implemented by the computer further includes the steps of:
- scrambling the source data prior to the generating step.

* * * * *